US012307253B2

(12) United States Patent
Dutta

(10) Patent No.: US 12,307,253 B2
(45) Date of Patent: May 20, 2025

(54) AFFINITY GROUPS IN A MICRO-OPERATIONS CACHE OF A PROCESSOR

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks OY, Espoo (FI)

( * ) Notice: Subject to any disclaimer, the term of this patent is extended or adjusted under 35 U.S.C. 154(b) by 191 days.

(21) Appl. No.: 17/742,615

(22) Filed: May 12, 2022

(65) Prior Publication Data
US 2023/0367600 A1 Nov. 16, 2023

(51) Int. Cl.
*G06F 9/30* (2018.01)
*G06F 12/0875* (2016.01)

(52) U.S. Cl.
CPC ........ *G06F 9/3016* (2013.01); *G06F 12/0875* (2013.01); *G06F 2212/452* (2013.01)

(58) Field of Classification Search
CPC ............... G06F 9/3016; G06F 12/0875; G06F 2212/452; G06F 9/30145
See application file for complete search history.

(56) References Cited

U.S. PATENT DOCUMENTS 5,630,083 A * 5/1997 Carbine .............. G06F 9/30145
712/E9.072
2003/0009620 A1* 1/2003 Solomon ............... G06F 9/3814
712/E9.055
2009/0249036 A1* 10/2009 Rappoport ............ G06F 9/3017
712/E9.016
2019/0188142 A1* 6/2019 Rappoport ............ G06F 9/3017
2020/0019406 A1* 1/2020 Kalamatianos ..... G06F 9/30145
(Continued)

FOREIGN PATENT DOCUMENTS

WO 2013077875 A1 5/2013
WO 2021216564 A1 10/2021

OTHER PUBLICATIONS

Bird, S., et al., "Performance Characterization of SPEC CPU Benchmarks on Intel's Core Microarchitecture Based Processor," accessed from https://www.spec.org/workshops/2007/austin/papers/Performance_Characterization_SPEC_CPU_Benchmarks.pdf, Computer Science, Dec. 2007, 7 pages.
(Continued)

*Primary Examiner* — Francisco A Grullon
(74) *Attorney, Agent, or Firm* — Tong, Rea, Bentley & Kim, LLC

(57) ABSTRACT

Various example embodiments for supporting affinity groups in a micro-operations cache (UC) of a processor are presented herein. Various example embodiments for supporting affinity groups in a UC of a processor may be configured to support grouping of cache lines of the UC into affinity groups. Various example embodiments for supporting affinity groups in a UC of a processor may be configured to support grouping of cache lines of the UC into affinity groups such that micro-operations (UOPs) of multiple cache lines of an affinity group may be supplied to an execution unit of the processor as a group, thereby enabling execution of the UOPs of the multiple cache lines of the affinity group within a given clock cycle of the processor.

25 Claims, 21 Drawing Sheets

(56) References Cited

U.S. PATENT DOCUMENTS

| | | | |
|---|---|---|---|
| 2020/0150966 A1* | 5/2020 | Agrawal | G06F 9/3804 |
| 2020/0285466 A1* | 9/2020 | Kotra | G06F 9/223 |
| 2020/0410088 A1* | 12/2020 | Greenhalgh | G06F 12/1441 |
| 2021/0279054 A1* | 9/2021 | Kotra | G06F 9/223 |
| 2022/0107810 A1 | 4/2022 | Dutta | |

OTHER PUBLICATIONS

Kanter, D., "Haswell Instruction Set and Front-end," Intel's Haswell CPU Microarchitecture, accessed from http://www.realworldtech.com/haswell-cpu/2/, Nov. 13, 2012, 3 pages.

Extended EP Search Report, Application No. 23169893.7, Sep. 28, 2023, 9 pages.

* cited by examiner

INSTRUCTION CACHE 400

INSTRUCTION POINTER 500

PROGRAM 600

Instr_1
Instr_2
Instr_3
cond_jump_100
Instr_4
Instr_5
.....
....
Instr_25
Instr_26
Instr_27
jump_100
Instr_28
Instr_29
...
...
Instr_100
Instr_101
Instr_102
Instr_103
Instr_104
Instr_105
Instr_106
Instr_107
Instr_108
cond_jump_25
Instr_109
Instr_110
cond_jump_104

*FIG. 7A*

IC LINE 1

| Identifier: IP of Instr_1 |
|---|
| Instr_1 |
| Instr_2 |
| Instr_3 |
| cond_jump_100 |
| instr_4 |
| instr_5 |

*FIG. 7B*

IC LINE 2

| Identifier: IP of Instr_100 |
|---|
| Instr_100 |
| Instr_101 |
| Instr_102 |
| Instr_103 |
| Instr_104 |
| Instr_105 |
| Instr_106 |
| Instr_107 |
| Instr_108 |
| cond_jump_25 |
| Instr_109 |
| Instr_110 |
| cond_jump_104 |

*FIG. 7C*

IC LINE 3

| Identifier: IP of Instr_25 |
|---|
| Instr_25 |
| Instr_26 |
| Instr_27 |
| jump_100 |
| Instr_28 |
| Instr_29 |

FIG. 10A

UC LINE 1

| Identifier: IP of Instr_1, size = x1 bytes |
|---|
| UOP(s) of Instr_1 |
| UOP(s) of Instr_2 |
| UOP(s) of Instr_3 |
| UOP(s) of cond_jump_100 |

FIG. 10B

UC LINE 2

| Identifier: IP of Instr_100, size = x2 bytes |
|---|
| UOP(s) of Instr_100 |
| UOP(s) of Instr_101 |
| UOP(s) of Instr_102 |
| UOP(s) of Instr_103 |

FIG. 10C

UC LINE 3

| Identifier: IP of Instr_104, size = x3 bytes |
|---|
| UOP(s) of Instr_104 |
| UOP(s) of Instr_105 |
| UOP(s) of Instr_106 |

FIG. 10D

UC LINE 4

| Identifier: IP of Instr_107, size = x4 bytes |
|---|
| UOP(s) of Instr_107 |
| UOP(s) of Instr_108 |
| UOP(s) of cond_jump_25 |

*FIG. 10E*

UC LINE 5

| Identifier: IP of Instr_25, size = x5 bytes |
|---|
| UOP(s) of Instr_25 |
| UOP(s) of Instr_26 |
| UOP(s) of Instr_27 |
| UOP(s) of jump_100 |

*FIG. 10F*

UC LINE 6

| Identifier: IP of Instr_109, size = x6 bytes |
|---|
| UOP(s) of Instr_109 |
| UOP(s) of Instr_110 |
| UOP(s) of cond_jump_104 |

FIG. 12A

UC LINE 1

| |
|---|
| Identifier: IP of Instr_1, Size = x1 bytes<br>Affinity Group Record: {affinity_group = 1, position = 1} |
| UOP(s) of Instr_1 |
| UOP(s) of Instr_2 |
| UOP(s) of Instr_3 |
| UOP(s) of cond_jump_100 |

FIG. 12B

UC LINE 2

| |
|---|
| Identifier: IP of Instr_100, size = x2 bytes<br>Affinity Group Record: {affinity_group = 2, position = 1} |
| UOP(s) of Instr_100 |
| UOP(s) of Instr_101 |
| UOP(s) of Instr_102 |
| UOP(s) of Instr_103 |

FIG. 12C

UC LINE 3

| |
|---|
| Identifier: IP of Instr_104, size = x3 bytes<br>Affinity Group Record: {affinity_group = 2, position = 2} |
| UOP(s) of Instr_104 |
| UOP(s) of Instr_105 |
| UOP(s) of Instr_106 |

FIG. 12D

UC LINE 4

| |
|---|
| Identifier: IP of Instr_107, size = x4 bytes<br>Affinity Group Record: {affinity_group = 2, position = 3} |
| UOP(s) of Instr_107 |
| UOP(s) of Instr_108 |
| UOP(s) of cond_jump_25 |

*FIG. 12E*

UC LINE 5

| Identifier: IP of Instr_25, size = x5 bytes<br>Affinity Group Record: {affinity_group = 3, position = 1} |
|---|
| UOP(s) of Instr_25 |
| UOP(s) of Instr_26 |
| UOP(s) of Instr_27 |
| UOP(s) of jump_100 |

*FIG. 12F*

UC LINE 6

| Identifier: IP of Instr_109, size = x6 bytes<br>Affinity Group Record: {affinity_group = 4, position = 1} |
|---|
| UOP(s) of Instr_109 |
| UOP(s) of Instr_110 |
| UOP(s) of cond_jump_104 |

AFFINITY GROUPS IN A MICRO-OPERATIONS CACHE OF A PROCESSOR

TECHNICAL FIELD

Various example embodiments relate generally to computer systems and, more particularly but not exclusively, to processors of computer systems.

BACKGROUND

Computer systems utilize various types of processors to perform various functions in various contexts.

SUMMARY

In at least some example embodiments, an apparatus includes a decode unit configured to decode an instruction into a set of micro-operations and a micro-operations cache configured to store, in a cache line of the micro-operations cache, the set of micro-operations and assign, at the micro-operations cache, the cache line to an affinity group. In at least some example embodiments, to assign the cache line to the affinity group, the micro-operations cache is configured to store, by the micro-operations cache for the cache line, an affinity group record indicative of assignment of the cache line to the affinity group. In at least some example embodiments, the affinity group record is stored as a part of metadata of the cache line. In at least some example embodiments, the affinity group record includes an affinity group identifier of the affinity group and a position value indicative of a position of the cache line in the affinity group. In at least some example embodiments, the decode unit is configured to decode a second instruction into a second set of micro-operations, and the micro-operations cache is configured to store, in a second cache line of the micro-operations cache, the second set of micro-operations. In at least some example embodiments, the micro-operations cache is configured to assign the second cache line to a second affinity group based on a determination that the set of micro-operations and the second set of micro-operations are part of separate instruction execution sequences. In at least some example embodiments, the micro-operations cache is configured to assign the second cache line to the affinity group based on a determination that the set of micro-operations and the second set of micro-operations are part of a common instruction execution sequence. In at least some example embodiments, the cache line is assigned to a first position of the affinity group, and the second cache line is assigned to a second position of the affinity group. In at least some example embodiments, to assign the second cache line to the affinity group, the micro-operations cache is configured to store, by the micro-operations cache for the second cache line, an affinity group record indicative of assignment of the second cache line to the affinity group. In at least some example embodiments, the affinity group record includes an affinity group identifier of the affinity group and a position value indicative of a position of the second cache line in the affinity group. In at least some example embodiments, the micro-operations cache is configured to identify, based on a request to lookup the instruction, the cache line storing the set of micro-operations, determine, based on the cache line storing the set of micro-operations, the affinity group to which the cache line is assigned, determine, based on the affinity group to which the cache line is assigned, that the second cache line is assigned to the affinity group, and supply, to an execution unit based on the cache line and the second cache line being assigned to the affinity group, a group of micro-operations including each micro-operation in the cache line and each micro-operation in the second cache line. In at least some example embodiments, the micro-operations in the group of micro-operations are supplied to the execution unit in an order that is based on respective positions of the cache line and the second cache line in the affinity group.

In at least some example embodiments, a non-transitory computer-readable medium stores computer program code configured to cause an apparatus to decode, by a decode unit, an instruction into a set of micro-operations, store, by a micro-operations cache in a cache line of the micro-operations cache, the set of micro-operations, and assign, at the micro-operations cache, the cache line to an affinity group. In at least some example embodiments, to assign the cache line to the affinity group, the non-transitory computer-readable medium stores computer program code configured to cause the apparatus to store, by the micro-operations cache for the cache line, an affinity group record indicative of assignment of the cache line to the affinity group. In at least some example embodiments, the affinity group record is stored as a part of metadata of the cache line. In at least some example embodiments, the affinity group record includes an affinity group identifier of the affinity group and a position value indicative of a position of the cache line in the affinity group. In at least some example embodiments, the non-transitory computer-readable medium stores computer program code configured to cause the apparatus to decode, by the decode unit, a second instruction into a second set of micro-operations and store, by the micro-operations cache in a second cache line of the micro-operations cache, the second set of micro-operations. In at least some example embodiments, the non-transitory computer-readable medium stores computer program code configured to cause the apparatus to assign, by the micro-operations cache to a second affinity group based on a determination that the set of micro-operations and the second set of micro-operations are part of separate instruction execution sequences, the second cache line. In at least some example embodiments, the non-transitory computer-readable medium stores computer program code configured to cause the apparatus to assign, by the micro-operations cache to the affinity group based on a determination that the set of micro-operations and the second set of micro-operations are part of a common instruction execution sequence, the second cache line. In at least some example embodiments, the cache line is assigned to a first position of the affinity group, and the second cache line is assigned to a second position of the affinity group. In at least some example embodiments, to assign the second cache line to the affinity group, the non-transitory computer-readable medium stores computer program code configured to cause the apparatus to store, by the micro-operations cache for the second cache line, an affinity group record indicative of assignment of the second cache line to the affinity group. In at least some example embodiments, the affinity group record includes an affinity group identifier of the affinity group and a position value indicative of a position of the second cache line in the affinity group. In at least some example embodiments, the non-transitory computer-readable medium stores computer program code configured to cause the apparatus to identify, based on a request to lookup the instruction, the cache line storing the set of micro-operations, determine, based on the cache line storing the set of micro-operations, the affinity group to which the cache line is assigned, determine, based on the affinity group to which the cache line is assigned, that the second cache line is assigned to the affinity group, and supply, to an execution unit based on the cache line and the second cache line being assigned to the affinity group, a group of micro-operations including each micro-operation in the cache line and each micro-operation in the second cache line. In at least some example embodiments, the micro-operations in the group of micro-operations are supplied to the execution unit in an order that is based on respective positions of the cache line and the second cache line in the affinity group.

In at least some example embodiments, a method includes decoding, by a decode unit, an instruction into a set of micro-operations, storing, by a micro-operations cache in a cache line of the micro-operations cache, the set of micro-operations, and assigning, at the micro-operations cache, the cache line to an affinity group. In at least some example embodiments, assigning the cache line to the affinity group includes storing, by the micro-operations cache for the cache line, an affinity group record indicative of assignment of the cache line to the affinity group. In at least some example embodiments, the affinity group record is stored as a part of metadata of the cache line. In at least some example embodiments, the affinity group record includes an affinity group identifier of the affinity group and a position value indicative of a position of the cache line in the affinity group. In at least some example embodiments, the method further includes decoding, by the decode unit, a second instruction into a second set of micro-operations and storing, by the micro-operations cache in a second cache line of the micro-operations cache, the second set of micro-operations. In at least some example embodiments, the method further includes assigning, by the micro-operations cache to a second affinity group based on a determination that the set of micro-operations and the second set of micro-operations are part of separate instruction execution sequences, the second cache line. In at least some example embodiments, the method further includes assigning, by the micro-operations cache to the affinity group based on a determination that the set of micro-operations and the second set of micro-operations are part of a common instruction execution sequence, the second cache line. In at least some example embodiments, the cache line is assigned to a first position of the affinity group, and the second cache line is assigned to a second position of the affinity group. In at least some example embodiments, assigning the second cache line to the affinity group includes storing, by the micro-operations cache for the second cache line, an affinity group record indicative of assignment of the second cache line to the affinity group. In at least some example embodiments, the affinity group record includes an affinity group identifier of the affinity group and a position value indicative of a position of the second cache line in the affinity group. In at least some example embodiments, the method includes identifying, based on a request to lookup the instruction, the cache line storing the set of micro-operations, determining, based on the cache line storing the set of micro-operations, the affinity group to which the cache line is assigned, determining, based on the affinity group to which the cache line is assigned, that the second cache line is assigned to the affinity group, and supplying, to an execution unit based on the cache line and the second cache line being assigned to the affinity group, a group of micro-operations including each micro-operation in the cache line and each micro-operation in the second cache line. In at least some example embodiments, the micro-operations in the group of micro-operations are supplied to the execution unit in an order that is based on respective positions of the cache line and the second cache line in the affinity group.

In at least some example embodiments, an apparatus includes means for decoding an instruction into a set of micro-operations, means for storing, in a cache line of a micro-operations cache, the set of micro-operations, and means for assigning, at the micro-operations cache, the cache line to an affinity group. In at least some example embodiments, the means for assigning the cache line to the affinity group includes means for storing, for the cache line, an affinity group record indicative of assignment of the cache line to the affinity group. In at least some example embodiments, the affinity group record is stored as a part of metadata of the cache line. In at least some example embodiments, the affinity group record includes an affinity group identifier of the affinity group and a position value indicative of a position of the cache line in the affinity group. In at least some example embodiments, the apparatus further includes means for decoding a second instruction into a second set of micro-operations and means for storing, in a second cache line of the micro-operations cache, the second set of micro-operations. In at least some example embodiments, the apparatus further includes means for assigning, to a second affinity group based on a determination that the set of micro-operations and the second set of micro-operations are part of separate instruction execution sequences, the second cache line. In at least some example embodiments, the apparatus further includes means for assigning, to the affinity group based on a determination that the set of micro-operations and the second set of micro-operations are part of a common instruction execution sequence, the second cache line. In at least some example embodiments, the cache line is assigned to a first position of the affinity group, and the second cache line is assigned to a second position of the affinity group. In at least some example embodiments, the means for assigning the second cache line to the affinity group includes means for storing, for the second cache line, an affinity group record indicative of assignment of the second cache line to the affinity group. In at least some example embodiments, the affinity group record includes an affinity group identifier of the affinity group and a position value indicative of a position of the second cache line in the affinity group. In at least some example embodiments, the apparatus includes means for identifying, based on a request to lookup the instruction, the cache line storing the set of micro-operations, means for determining, based on the cache line storing the set of micro-operations, the affinity group to which the cache line is assigned, means for determining, based on the affinity group to which the cache line is assigned, that the second cache line is assigned to the affinity group, and means for supplying, to an execution unit based on the cache line and the second cache line being assigned to the affinity group, a group of micro-operations including each micro-operation in the cache line and each micro-operation in the second cache line. In at least some example embodiments, the micro-operations in the group of micro-operations are supplied to the execution unit in an order that is based on respective positions of the cache line and the second cache line in the affinity group.

BRIEF DESCRIPTION OF THE DRAWINGS

The teachings herein can be readily understood by considering the following detailed description in conjunction with the accompanying drawings, in which:

FIGS. 7A-7C depict example embodiments of cache lines in an instruction cache of a processor for the program of FIG. 6;

FIGS. 10A-10F depict example embodiments of cache lines in a micro-operations cache of a processor for the program of FIG. 6;

FIGS. 12A-12F depict example embodiments of cache lines, in a micro-operations cache that supports affinity grouping, for the program of FIG. 6;

To facilitate understanding, identical reference numerals have been used herein, wherever possible, in order to designate identical elements that are common among the various figures.

DETAILED DESCRIPTION

Various example embodiments for supporting affinity groups in a micro-operations cache (UC) of a processor are presented herein. Various example embodiments for supporting affinity groups in a UC of a processor may be configured to support grouping of cache lines of the UC into affinity groups. Various example embodiments for supporting affinity groups in a UC of a processor may be configured to support grouping of cache lines of the UC into affinity groups such that micro-operations (UOPs) of multiple cache lines of an affinity group may be supplied to an execution unit of the processor as a group, thereby enabling execution of the UOPs of the multiple cache lines of the affinity group within a given clock cycle of the processor. It will be appreciated that these and various other example embodiments and advantages or potential advantages of supporting affinity groups in a UC of a processor may be further understood by way of reference to the various figures, which are discussed further below.

Figure 1:
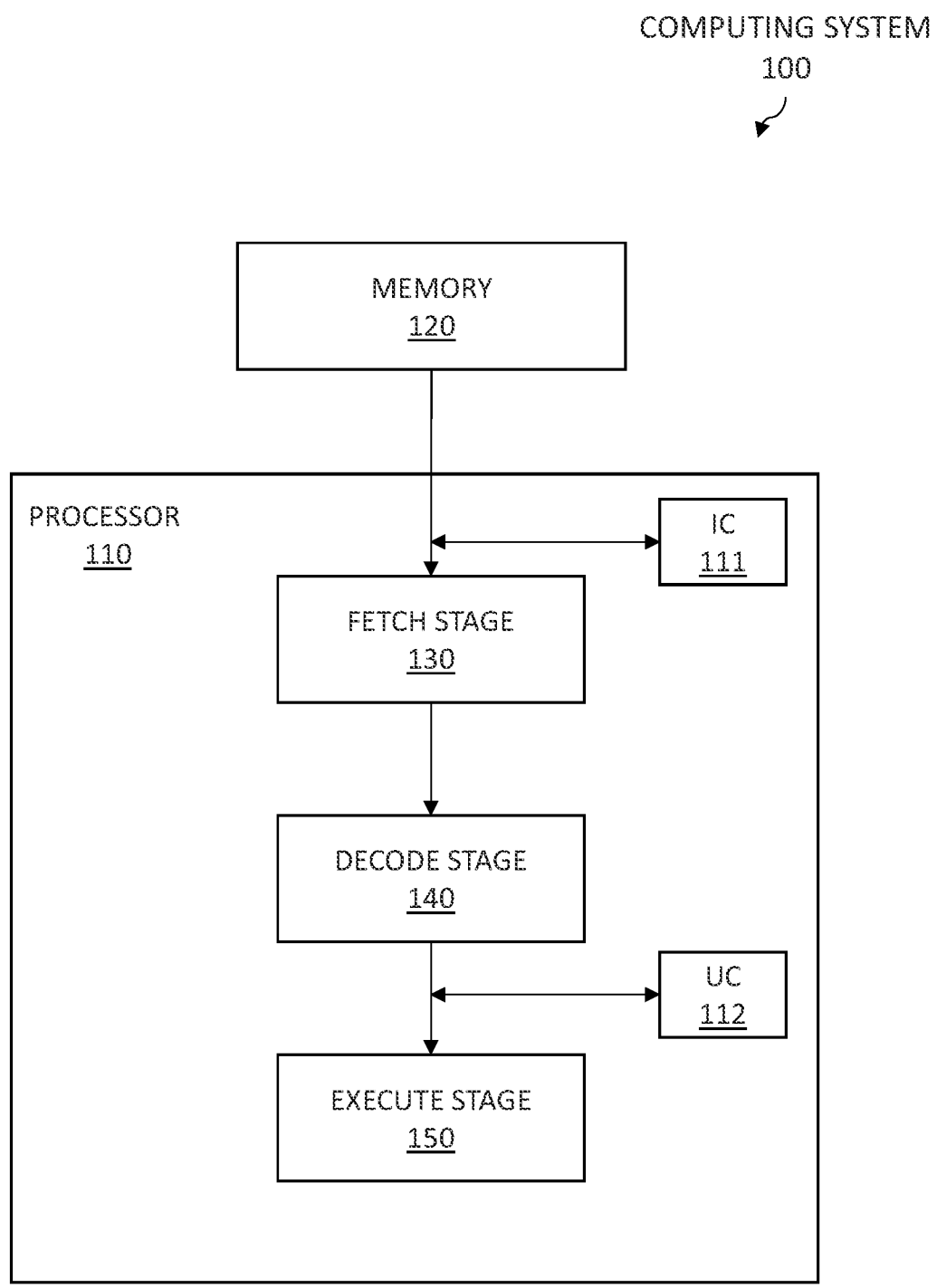
FIG. 1 depicts an example embodiment of computing system including a processor and a memory for illustrating an instruction pipeline supported by the processor.

FIG. 1 depicts an example embodiment of computing system including a processor and a memory for illustrating an instruction pipeline supported by the processor.

The computing system 100 includes a processor 110 and a memory 120. The processor 110 includes an instruction cache (IC) 111 and a micro-operations cache (UC) 112. The high level stages in the processor pipeline supported by the processor 110 include a fetch stage 130, a decode stage 140, and an execute stage 150. It will be appreciated that such stages of the processor pipeline of the processor 110 may be further understood by way of reference to FIG. 2.

In the processor 110, the format and encoding of the instructions in a program is determined by the Instruction Set Architecture (ISA) of the processor 110. For example, some well-known ISAs are include x86/x86-64, IA-32/IA-64, MIPS, ARM, and so forth; however, the micro-architecture of a processor cannot execute the instructions of an ISA in their native form because of their complexity. An ISA is designed to offer sophisticated operations which, in turn, also keep the program compact, i.e., reduces the foot print of a program in the memory. It is noted that the optimal footprint of a program in memory is particularly important for optimal use of the IC. A majority of ISAs offer variable-length instructions, which further adds to the complexity of execution. So, at the micro-architectural level of a processor, instructions are represented by fixed length simpler micro-operations (generally referred to as "micro-ops" or "UOPs"). An ISA instruction is broken down into one or more fixed-length UOPs. UOPs perform basic operations on data stored in one or more registers, including transferring data between registers or between registers and external buses, performing arithmetic and logical operations on registers, and so forth. For example, an add-register-to-memory ISA instruction performs addition of the value in a register X to the value in a memory location M. The instruction is broken down into a sequence of three separate UOPs as follows: (1) load from M to a register Y, (2) add Y to X, and (3) store X to M.

In the processor 110, execution of a program is based on pipeline which, as indicated above, includes the fetch stage 130, the decode stage 140, and the execute stage 150. The fetch stage 130 retrieves a block of instructions of a program from memory 120 or IC 111. The IC 111 is located on board the processor 110. The IC 111 is generally much smaller in size (e.g., 32 KB, 64 KB, 128 KB, or the like) than the memory 120 and, thus, much faster than the memory 120. The IC 111 caches blocks of instructions fetched from the memory 120. If a set of instructions is repeatedly fetched then those instructions are likely available in the IC 111, so a hit in the IC 111 reduces the time to fetch instructions (as compared with fetching the instructions from the memory 120). The IC 111 is agnostic of syntax and semantics of instructions and caches in units of memory blocks, i.e., all instructions in a certain range of addresses in memory 120.

The processor 110 fetches a block of instructions from the memory 120 only if the block is not found in the IC 111. In the IC 111, a memory block is identified by the first memory address in the memory block. In the decode stage 140, instructions fetched during the fetch stage 130 are dynamically decoded by the processor 110 to the native UOPs of the instructions. This dynamic decoding also provides a cleaner separation of the "stable" and "standardized" ISA from the underlying micro-architecture of the processor that is free to define its own UOP set. As a result, a program that has been written for an ISA can run on different micro-architectures supporting that ISA. This has enabled program compatibility between different generations of processors to be easily achieved. For example, different micro-architectures can support the same ISA, but each can define their own native UOP set. The execute stage 150 executes the UOPs supplied by the decode stage 140.

In the processor 110, the fetch stage 130 and the decode stage 140 generally are costly in terms of clock cycles as well as power consumption. So, many modern processors implement another instruction cache, typically referred to as a micro-operations cache (UC) or decoded stream buffer (DSB), which stores the already decoded UOPs. This is illustrated as the UC 112 of the processor 110. When the processor 110 needs to execute an instruction and its decoded UOPs already exists in the UC 112, then the UC 112 can directly supply the UOPs to the execution unit. The UC 112 is generally much smaller in size (e.g. 1.5 KB, 2 KB, 3 KB, or the like) than the IC 111 and the memory 120 and, thus, much faster than the IC 111 and the memory 120 (typically operating at the clock speed of the processor 110). A hit in UC 112 eliminates the fetch stage 130 and the decode stage 140, both of which are costly, thereby improving the performance and power budget of the processor 110. An instruction is fetched and decoded only if it is a miss in the UC 112, otherwise the fetch stage 130 and the decode stage 140 are not needed and even can be powered off.

The UC 112 stores the UOPs received from the decode stage 140 in smaller sized blocks referred to as UC lines, but in the sequential order of execution. This means that each branch, conditional or unconditional, makes the processor 110 start with a new UC line even if the current UC line is not yet filled. This simple rule allows high bandwidth fetching from the UC 112 since, once there is a hit in UC 112, then the entire UC line can be supplied to the execute stage 150 without worrying about a change of execution sequence in the middle of a UC line. Herein, unless indicated otherwise, an address of an instruction in memory is referred to as an Instruction Pointer (IP). A UC line is identified by the IP of the parent instruction of the first UOP in the block; other than that no correlation exists between the UOPs in a UC line and their corresponding parent instructions, and it is noted that such correlation is not required since the entire UC line is supplied to the execute stage 150. As a result, UOPs in a UC line cannot be looked up by the IPs of their parent instructions.

It will be appreciated that processors generally implement each of the three high-level stages of the instruction pipeline using additional stages. As a result, a pipeline of a processor may be composed of a large number of stages (e.g., 20 or more stages). An example of a processor, for illustrating stages used to implement portions of the instruction pipeline, is presented with respect to FIG. 2.

Figure 2:
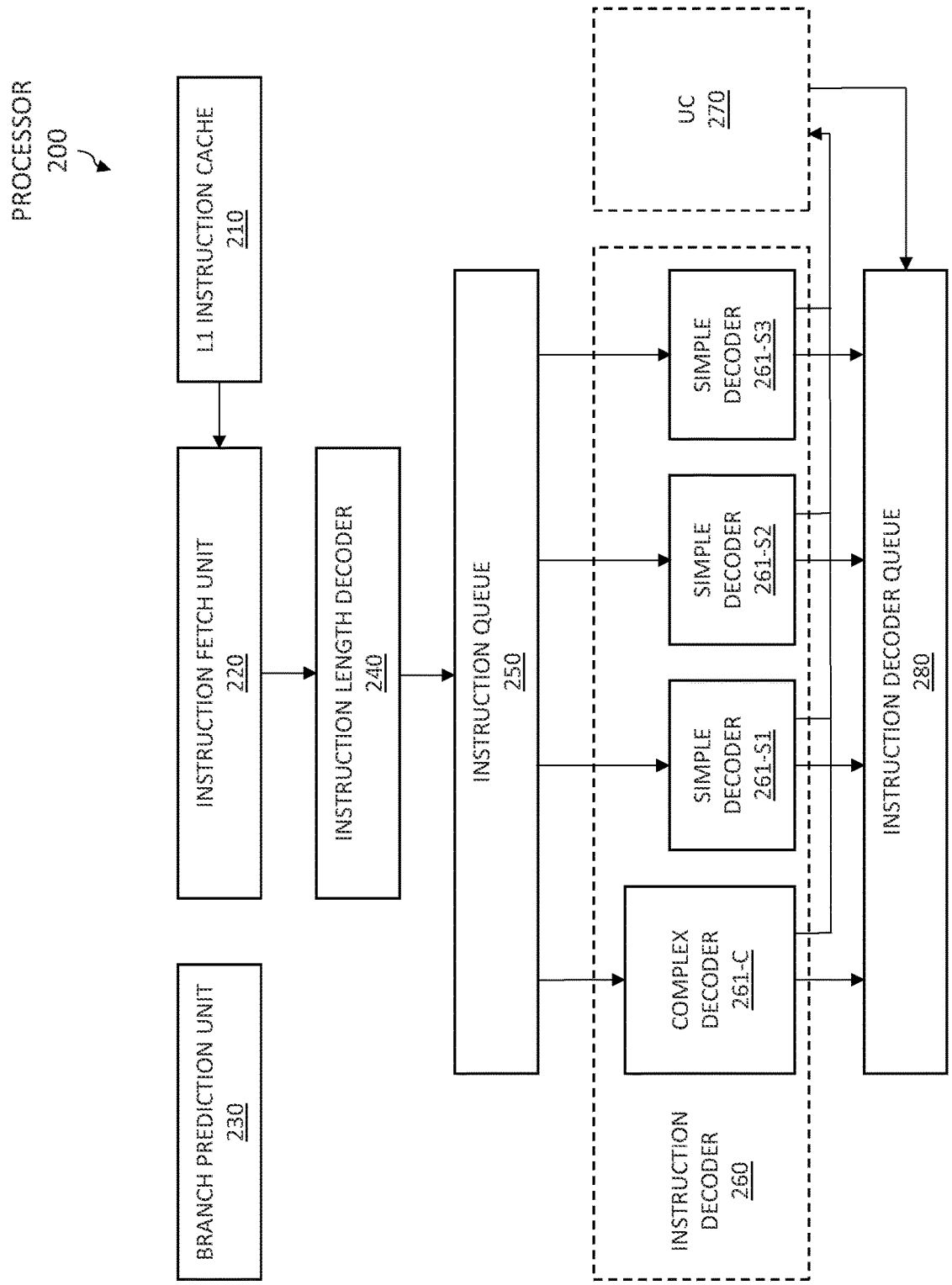
FIG. 2 depicts an example embodiment of a processor for use as the processor of the computing system of FIG. 1.

FIG. 2 depicts an example embodiment of a processor for use as the processor of the computing system of FIG. 1.

The processor 200 includes a level 1 (L1) instruction cache (L1-IC) 210, an instruction fetch unit (IFU) 220, a branch prediction unit (BPU) 230, an instruction length decoder (ILD) 240, an instruction queue (IQ) 250, an instruction decoder (ID) 260, a UOP cache (UC) 270, and an instruction decoder queue (IDQ) 280. It will be appreciated that the IFU 220 and BPU 230 may be considered to form the fetch stage (e.g., fetch stage 130 of FIG. 1) while the ILD 240, ID 260, and IDQ 280 may be considered to form the decode stage (e.g., decode stage 140 of FIG. 1).

The L1-IC 210 is a cache that is part of the cache hierarchy of the associated processor 200 and may be further understood by considering the cache hierarchy of processors and the cache arrangement of caches.

In general, a cache is a smaller, faster memory, closer to a processor, which stores copies of the program data or program instructions from frequently used memory locations to reduce the average cost of access (e.g., time or energy). The data or program instructions are stored in the cache by blocks of contiguous memory locations, typically referred to as cache lines, where each cache line is indexed in the cache by the first memory address in the cache line. Caches benefit from the temporal and spatial locality of memory access patterns in a program, where spatial locality refers to use of relatively close memory locations (i.e., within a cache line) and temporal locality refers to the reuse of specific cache line within a relatively small time duration. Many processors use multiple levels of caches. For example, a common processor architecture might utilize at least three levels (L) of caches, which are typically referred to as L1, L2, and L3. The L1 cache is the smallest and nearest to the processor and, thus, faster than the other cache levels. Typically, the L1 cache is split into two portions: the L1 Instruction Cache (e.g., 32 KB in size, although other sizes may be used) which holds only program instructions and the L1 Data Cache (e.g., 32 KB in size, although other sizes may be used) which holds only program data. The L2 cache (e.g., 256 KB in size, although other sizes may be used) and the L3 cache (e.g., 2 MB in size, although other sizes may be used) are the subsequent levels which are usually unified caches (meaning that they hold both instructions and program data). The L3 cache typically is common for the processor cores in a multi-core processor and, thus, is located outside of the processor cores. It will be appreciated that the cache size and access latency grow according to the levels. If the cache line corresponding to a memory address sought is missing in the L1 cache, then the processor looks up in subsequent levels of caches (e.g., the L2 cache, then the L3 cache, and so forth). If the memory address is missing in all of the available cache levels, then the processor can access the main memory to retrieve the instruction or data at the memory address. So, main memory is accessed only if the memory address is missing in all caches. The missing block, once located, is brought into a cache line in the L1 cache.

In general, a cache is typically organized as set associative array, which can be imagined as M×N matrix. The cache is divided into M sets and each set contains N cache lines. To place a memory block into the cache, its address is typically segregated into three fields—tag, index, offset. A memory block is first mapped into a set based on 'index bits' derived from the address of the memory block. Then the memory block is placed into a cache line in the set and a 'tag' is stored in the cache line. The tag is composed of the bits in the address of the memory block (other than the index bits) that can distinguish between the cache lines sharing the same set. The offset field refers to any address within a cache line. The offset field is composed of a few least significant bits of the address and the number of bits is dependent on the size of the cache line. For example, if the cache line size is 64 B, then the six least significant bits of the addresses are the offset bits. Here, the term Instruction Pointer (IP) is used to denote the memory address of an instruction, and the 3 fields of an IP that are used to map a block of instructions into a cache are referred to as IP-tag, IP-index, and IP-offset. If all cache lines in a set are occupied while trying to store a new memory block, then an existing cache line in the set is evicted (a replacement policy picks which cache line to evict) to make way for the new memory block. When the evicted cache line is accessed later, then it will result in a miss in the cache and, thus, will need to be brought back into the cache from the memory hierarchy. Such misses are referred to as conflict misses and repeated conflict misses due to collisions between cache lines sharing the same set is referred to as thrashing.

The IFU 220 is responsible for feeding the processor 200 with instructions to execute, and thus, it is the first component where instructions are processed. The IFU 220 mainly includes the required logic to compute the next fetch address and then fetch the instructions from the L1-IC 210. The instructions are fetched from the L1-IC 210 by the IFU 220 in streams of raw bytes.

The BPU 230 is configured to predict the next fetch address for the IFU 220 because, otherwise, branch instructions introduce a significant extra level of complexity in fetching streams of instructions, since the correct fetch address cannot be calculated until the branch instruction itself is executed. By default, instructions are processed by a processor sequentially. This sequential execution can be disrupted by the control instructions (e.g., conditional branches, unconditional branches, subroutine calls and subroutine returns, and so forth) to start executing an instruction sequence starting at a new address (the target address). For example, JE (Jump If Equal) is an example of a conditional branch instruction in x86. A conditional branch is data-dependent (e.g., value of a data element acts as the condition) and branches to the target address only if the condition is true. For example, instructions such as CALL, RET, and JUMP are examples of a subroutine call, a subroutine return, and an unconditional branch, respectively, in x86. Any control instruction other than conditional branch instruction will always switch the execution sequence to the target address specified in the instruction. Herein, the target instruction sequence of a control instruction is referred to generally as a control block. Execution of a program can be viewed as executing a chain of certain control blocks. Herein, an order of execution of control blocks in a program is referred to as a control flow (i.e., flow of control). Conditional branches (e.g., JE) can generate multiple control flows in a program since every such branch is a fork and the execution can go either way on the fork based on the condition of the fork. Control instructions introduce significant extra complexity in fetching streams of instructions, since the correct fetch address after the control instruction cannot be calculated until the backend executes the control instruction itself. For this reason, the frontend of high-performance processors (namely, the BPU 230) predicts the next fetch address and speculatively starts fetching from the predicted address. There are two parts in this prediction. The first is predicting the direction of the branch taken by the control instruction, i.e., taken to the target sequence or not taken. The second part is predicting the target address of a branch. Once the direction of a branch is predicted, the memory address of the control instruction and its predicted target address are stored in a Branch Target Buffer (BTB), which is a cache organized similar to the set associative array described in the context of L1-IC 210.

The ILD 240 provides a pre-decode phase. The ILD 240 separates the raw byte stream from IFU 220 into a sequence of valid instructions and passes them to the IQ 250. For example, as indicated above, the length of an x86 instruction may vary between 1 B to 15B and may reside in any byte address in program memory, thus, requiring segregation of the raw byte stream into instructions of variable lengths. Decoding the length of several instructions per cycle adds a level of complexity, since the start addresses have to be speculatively determined. That is, the fact that the starting address of the second instruction is not known until the first instruction is decoded and its length computed, imposes serialization of the length decoding process, and parallelizing this requires determining the length of each instruction before decoding it. The ILD 240 provides complex logic, based on many parallel and speculative computations, to help achieve such parallelization (although this comes at the price of increased power consumption).

The IQ 250 queues the instructions for the instruction decode phase. The IQ 250 queues the instructions, after the ILD 240 separates the instructions from the stream of raw bytes, for use by ID 260 in the instruction decode phase.

The ID 260 provides the instruction decode phase (which also may be referred to as a dynamic translation phase). In this phase, instructions are read from the IQ 250 and translated into subsequent functionally-equivalent UOPs. This translation is performed by one of several decoders in a set of decoders 261 including a complex decoder 261-C and three simple decoders 261-SI-261-S3 (although it will be appreciated that fewer or more instruction decoders may be used). Herein, the ID 260, including the set of decoders 261, also may be referred to as a Micro Instruction Translation Engine (MITE). The resultant UOPs are passed by the ID 260 to the IDQ 280, through which the UOPs may then enter the backend of the processor. For example, in an x86-based processor, simple instructions can translate into one to four UOPs and complex instructions can translate into five or more UOPs. It will be appreciated that for processors based on other ISAs, instructions may be translated into other numbers of UOPs.

The UC 270, generally speaking, is a UOP cache that is configured to cache UOPs for instructions previously decoded by the MITE, thereby obviating a need for the MITE to re-decode instructions previously decoded by the MITE in order to obtain the associated UOPs (namely, avoiding the L1-IC→IFU→ILD→MITE decode path). This type of cache may be referred to as an L0 Instruction Cache (L0-IC), which may store blocks of instructions decoded into UOPs, in units of UC lines. UOP caches benefit from the temporal locality of control flows in a program, due to which previously executed instructions are executed again. Before fetching an instruction address from the L1-IC 210, it is first looked up in the L0-IC. If the corresponding UC line exists (meaning a hit) in the L0-IC, then the associated UOPs are directly supplied to the IDQ 280 for further execution, thereby completely avoiding the L1-IC→IFU→ILD-→MITE decoding path. If the corresponding UC line does not exist (meaning a miss) in the L0-IC, then the instruction goes through entire complex decoding cycle through the L1-IC→IFU→ILD→MITE decoding path. The ability to avoid the L1-IC→IFU→ILD→MITE decoding path in this manner provides significant advantages, as the decoding process from instructions to UOPs (especially for high performance processors) can be costly in terms of circuitry, power consumption, and time, especially where a single complex instruction may perform several operations. It will be appreciated that, since the backend of a superscalar processor can execute several UOPs per clock cycle (e.g., 6 UOPs per cycle), the rate at which UOPs are supplied from the frontend of the processor to the backend of the processor is a key element of performance which may be achieved by high hit rate in the UC 270.

The IDQ 280 queues UOPs to be provided to the backend of the processor. The UOPs that are queued by the IDQ 280 may include UOPs decoded by the ID 260 (MITE) and UOPs delivered from the UC 270.

The backend of the processor 200, although the details are omitted for purposes of clarity, may include various elements such as a reorder buffer (e.g., configured to receive UOPs from the frontend 201), a unified reservation station having a set of ports configured to direct UOPs to various chains of elements), various elements or chains of elements configured to support execution of UOPs, or the like, as well as various combinations thereof.

Figure 3:
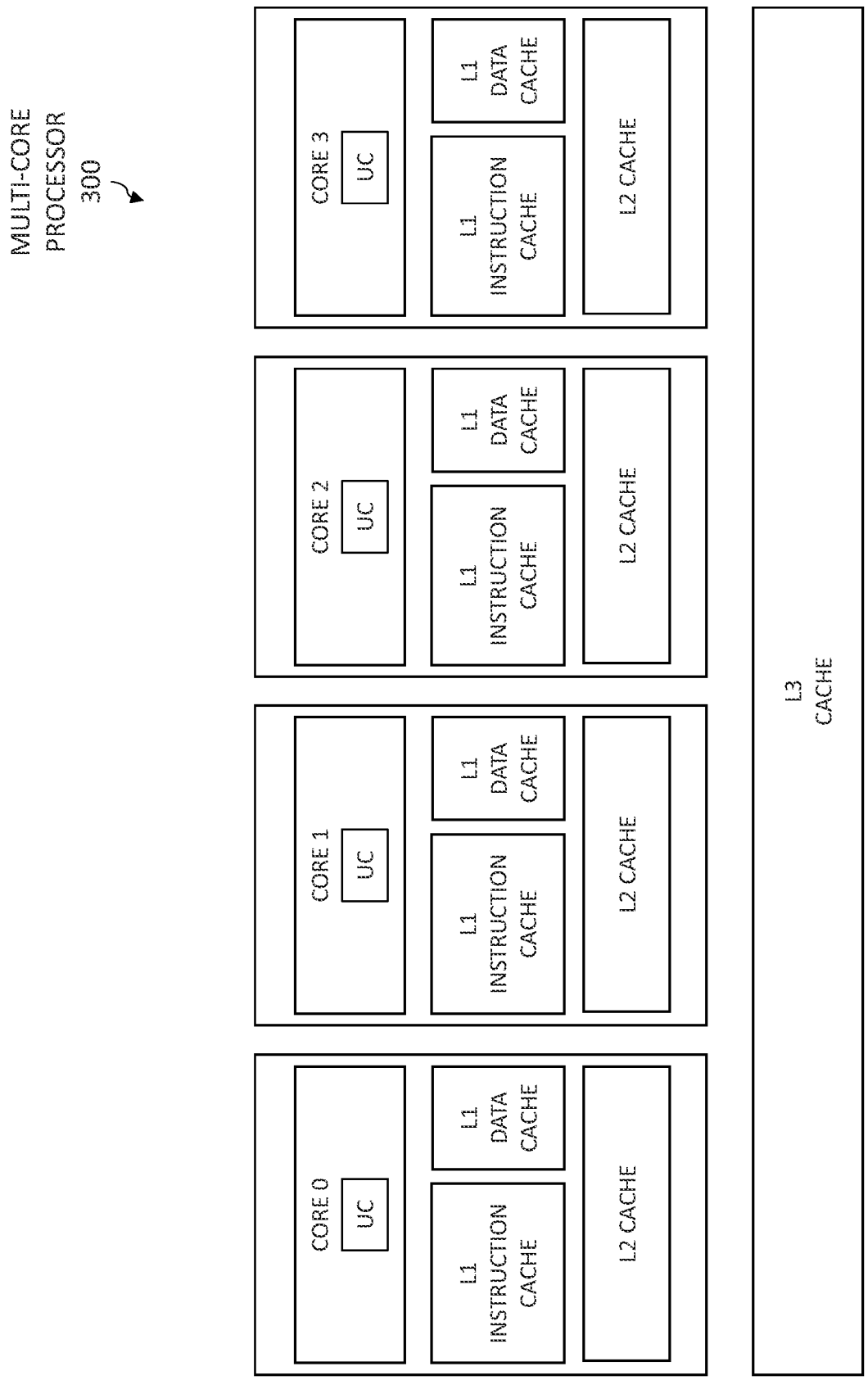
FIG. 3 depicts an example embodiment of a multi-core processor including multiple cores and multiple levels of caches.

FIG. 3 depicts an example embodiment of a multi-core processor including multiple cores and multiple levels of caches.

The multi-core processor 300 of FIG. 3 includes four cores (denoted as Core 0, Core 1, Core 2, and Core 3) and three levels of caches (denoted as L1, L2, and L3).

In general, a core is configured to operate as a processor (e.g., similar to the only core of a single core processor). Accordingly, it will be appreciated that each of the cores has its own pipeline (e.g., following the conceptual pipeline of FIG. 1, which may be implemented like the pipeline of FIG. 2 or using any other suitable pipeline implementation) that independently fetches, decodes, and executes instructions. Herein, unless indicated otherwise, the term "processor" may be referring to the only core of a single core processor or a core of a multi-core processor.

In general, a cache is a smaller, faster memory, closer to a processor core, which stores copies of program data or program instructions from frequently used memory locations to reduce the average cost (time or energy). The data or program instructions are stored in the cache by blocks of contiguous memory locations, referred to as cache lines, wherein each cache line is indexed in the cache by the first memory address in the cache line. Caches benefit from the temporal and spatial locality of memory access patterns in a program. Spatial locality refers to use of relatively close memory locations (i.e., within a cache line). Temporal locality refers to the reuse of a specific cache line within a relatively small time duration.

L1 cache is the smallest and nearest to the processor core and, thus, faster than the rest. L1 cache is split into two as follows: an L1 Instruction Cache (e.g., 32 KB size or other suitable size) which holds only program instructions and an L1 Data Cache (e.g., 32 KB size or other suitable size) which holds only program data. L2 caches (e.g., 256 KB size or other suitable size) and L3 caches (e.g., 2 MB size or other suitable size) are the subsequent levels of caches, which are usually unified caches (meaning that the caches hold both instructions and program data. The L1 Instruction Cache is the IC in FIG. 1. L3 cache is common for of the all cores in the processor. Size and access latency grow according to the levels. If the cache line corresponding to a memory address sought is missing in L1 cache, then processor performs lookups in subsequent levels of caches. Main memory is accessed only if the memory address is missing in all caches. Eventually, the missing block is read into a cache line in L1 cache. The UC is located inside a core. It will be appreciated that the operation of ICs and UCs in processors may be further understood by first considering the logical organization of an IC in a processor, an example embodiment of which is presented with respect to FIG. 4.

Figure 4:
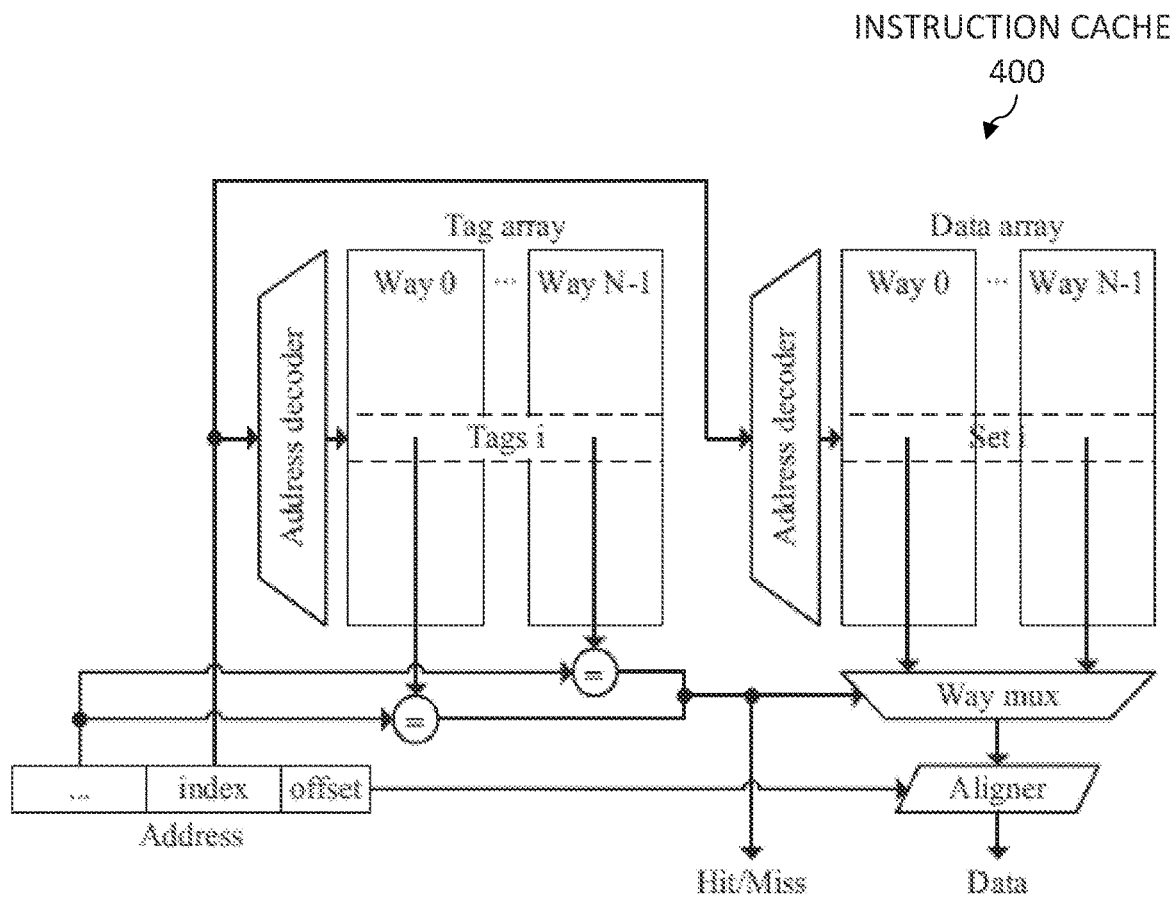
FIG. 4 depicts an example embodiment of an N-way set associative instruction cache for use in a processor.

FIG. 4 depicts an example embodiment of an N-way set associative instruction cache for use in a processor.

As illustrated in FIG. 4, the IC 400 includes two main building blocks: the tag array and the data array.

The data array stores the IC lines, while the tag array is used in order to match IPs into data array entries. The data array is logically organized as a group of S number of sets. Each set consists of N number of IC lines. The number of IC lines in a set is called the "degree of associativity" of the cache. It is noted that a cache of associativity N is a N-way associative cache, wherein each way is an IC line. A block of instructions in memory is first mapped into a set Si by its IP and then placed into any IC line Nj in the set Si. To map a block into the IC, the IP is partitioned into three fields as illustrated in FIG. 5.

Figure 5:
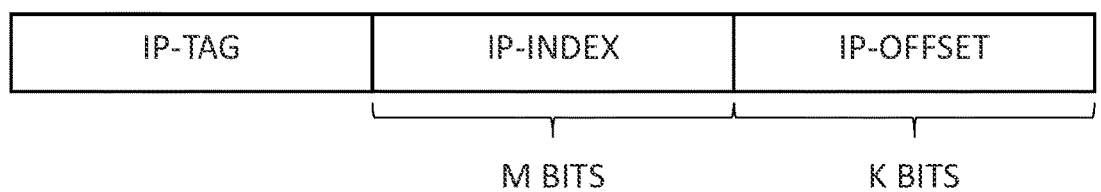
FIG. 5 depicts an example embodiment of an Instruction Pointer format for an address of an instruction in memory.

FIG. 5 depicts an example embodiment of an Instruction Pointer format for an address of an instruction in memory. Here, the term Instruction Pointer (IP) may be used to refer to the address of an instruction in memory. As illustrated in FIG. 5, the IP 500, in order to map a block into an IC, is partitioned into the following fields: IP-tag, IP-index, and IP-offset.

The IP-offset field (which also may be referred to as the block offset or, more generally, the offset) includes the K least significant bits of the IP, which are used to identify which bytes inside an IC line are to be accessed. Assuming the size of IC line is Q bytes, then $K=\log_2(Q)$ bits in the IP-offset field. Herein, unless indicated otherwise, these K bits are denoted as IP-offset.

The IP-index field (which also may be referred to more generally as the index) includes the M next least significant bits of the IP after the IP-offset field, which are used to identify the set Si in the IC. For a IC consisting of S sets, $M=\log_2(S)$ bits are needed in the IP-index field. Herein, unless indicated otherwise, these M bits are denoted as IP-index.

The IP-tag field includes the remaining bits of the IP which are not part of the IP-index field or the IP-offset field. Herein, unless indicated otherwise, these bits are denoted as IP-tag.

Different IC lines can map to the same set Si in the IC (they have the same IP-index due to overlapping M bits), so a mechanism is needed to reverse-map IP-indexes to IPs. The tag array serves this purpose. The tag array has the same logical organization as the data array (same number of sets S and associativity N). For each IC line in the data array, the tag array holds some metadata: the IP-tag bits and the state of the IC line (valid, etc.).

To lookup an IP, a set Si in both the data array and the tag arrays are accessed using the IP-index part; however, to know if an IC line within the set corresponds to the given IP, the IP-tag bits must match to an entry in set Si in the tag array. If the IP-tag bits of the j-th entry in set Si match, then the correct data is in the j-th IC line of the corresponding data array in set Si (this is called a cache hit). If no IP-tags in set Si match in the tag array, then the requested IC line does not reside in the IC (this is a cache miss). In the case of a cache miss, a request to the higher levels of the memory hierarchy must be issued and the processor must wait for the IC line to be installed in the IC before the access can proceed.

As an example, consider an 8-way associative cache with 64 sets with a cache line size of 64 B. Then, each cache line would hold a block of 64 B of instructions. Here K=6 and M=6. If the processor tries to access an instruction at IP 0xf045 (tag=0x1e, index=0x1, offset=0x5) then it looks for the cache line in set 1 bearing the tag 0x1e. If the IC line is found, then the 5$^{th}$ byte in the IC line is retrieved.

The access to the tag array and the data array can occur in parallel or serially. In FIG. 4, a whole set is read from the data array while the tag array is accessed. The address is compared with the IP-tag entries to find in which IC line of the set reside the data that needs to be accessed. This information is fed to a multiplexor at the output of the data array (the way multiplexor) that chooses one of the IC lines of the set. Finally, the offset part of the address is used to extract the appropriate bytes from the chosen IC line (this process is called data alignment).

The number of bits in the IP-offset field determines the size of an IC line, i.e., the size of an IC line is $\log_2$(number of bits in IP-offsetfield). The set in the IC is selected based on the IP-index and an IC line within the set (i.e., a way in the set) is tagged with the IP-tag. In the example in FIG. 4, IP-offset is 4-bits, IP-index is 4 bits, and IP-tag is 8-bits and, thus, for the exemplary IC line, IP-tag=0xFF and IP-index=x0. Thus, the IC line is tagged with 0xFF in the set 0. As evident, all instructions within an IC line share the same IP-tag and IP-index.

The IC suffers from conflict misses when P frequently accessed IC lines map to the same set Si, and the cache associativity N<P. In that case, one of the valid IC lines in the set Si needs to be evicted out to accommodate a newer IC line. Obviously, the higher the associativity, the less conflict misses the IC will suffer. On the other hand, the more ways the IC has, the bigger the way multiplexor becomes, and this may affect the cycle time of the processor. For example, a modern L1-IC is typically organized as 64 sets×8 ways×64 B per IC line, which provides a maximum capacity of 32 KB of instructions; however, it will be appreciated that other implementations may be used.

Figure 6:
FIG. 6 depicts an example embodiment of a program for illustrating caching of instructions of the program in a micro-operations cache.

FIG. 6 depicts an example embodiment of a program for illustrating caching of instructions of the program in a micro-operations cache.

The program 600 of FIG. 6 includes a set of instructions. The size of an instruction can vary, ranging from one byte to multiple bytes. A first execution sequence (of instructions) can be switched to a second execution sequence (of instructions) by a branch instruction, which may be an unconditional branch instruction (which switches the execution sequence from the first instruction sequence to the second instruction sequence) or a conditional branch instruction (which can decide to continue the first instruction sequence or switch to the second execution sequence based on some condition). A typical program has a branch instruction in every 6 instructions (although it will be appreciated that branch instructions may occur less or more frequently in various programs). The program 600 illustrates both unconditional branch instructions (denoted as jump_xx, which switches the execution sequence to instruction xx) and conditional branch instructions (denoted as cond_jump_xx, which can decide to continue the execution sequence or switch the execution sequence to instruction xx, based on some condition). The caching of the instructions in an IC by the processor is illustrated with respect to FIGS. 7A-7C. The construction of the UC blocks in the UC as the instructions of the program 600 are fetched and decoded by the processor is illustrated with respect to FIGS. 10A-10F.

FIGS. 7A-7C depict example embodiments of instruction lines in an instruction cache of a processor for the program of FIG. 6.

It is noted that, since the fetching stage is not aware of syntax and semantics of instructions, it is not necessary that an IC line terminate at the boundary of a multi-byte instruction and, thus, an instruction can span across two IC lines. Here, for simplicity and without loss of generality, embodiments of IC lines are described with instructions that terminate within a single IC line.

The processor starts fetching from Instr_1. Assume that Instr_1 to Instr_5 fits into an IC line. This means that all instructions in the IC line share the same IP-tag and IP-index. So, when the processor fetches Instr_1 from memory, it caches Instr_1 to Instr_5 in an IC line addressed by the IP of Instr_1, as shown in FIG. 7A.

The processor, after the execution of cond_jump_100, switches the execution sequence to start from Instr_100. The processor starts fetching from Instr_100. Assume that Instr_100 to cond_jump_104 fits into an IC line. So, when the processor fetches Instr_100 from memory, it caches Instr_100 to cond_jump_104 in an IC line addressed by the IP of Instr_100, as shown in FIG. 7B.

The processor, after execution of cond_jump_25, switches the execution sequence to start from Instr_25. The processor starts fetching from Instr_25. Assume that Instr_25 to Instr_29 fits into an IC line. So, when the processor fetches Instr_25 from memory, it caches Instr_25 to Instr_29 in an IC line addressed by the IP of Instr_25, as shown in FIG. 7C.

The processor, after the execution of jump_100, starts fetching from Instr_100. The processor hits the IC Line 2 which is addressed by the IP of Instr_100. Instr_100 is from IC Line 2. Assume that the execution of cond_jump_25 continues the execution sequence, so the processor continues execution of Instr_109 and onwards. Since Instr_109 shares the IP-tag and IP-index with Instr_100, the processor hits the IC Line 2. Instr_109 is fetched by its offset from the IC Line 2. Instr_109 until cond_jump_104 are fetched from IC Line 2.

The UC stores the UOPs received from the decode stage in smaller-sized lines, but in the sequential order of execution. This means that each branch, conditional or unconditional, makes the processor start with a new UC line even if the current IC line is not yet filled. This instruction semantic awareness of a UC is the key difference from an IC, as the IC simply stores blocks of instruction memory. This simple rule allows high bandwidth fetching from the UC since, once there is a hit in UC, then the entire UC line can be supplied to the execution stage without worrying about a change of execution sequence in the middle of a UC line. Herein, as discussed above, and unless indicated otherwise, an address of an instruction in memory is referred to as an IP, a UC line is identified by the IP of the parent instruction of the first UOP in the UC line, and, other than the first UOP no correlation exists between the other UOPs in a UC line to the corresponding parent instructions (and it is noted that such correlation is not required since the entire UC line is supplied to the execution stage when an IP to be fetched matches the identifier of a UC line). UC lines are typically organized in a N-way associative array, similar to an IC as in FIG. 4, an example embodiment of which is presented with respect to FIG. 8.

Figure 8:
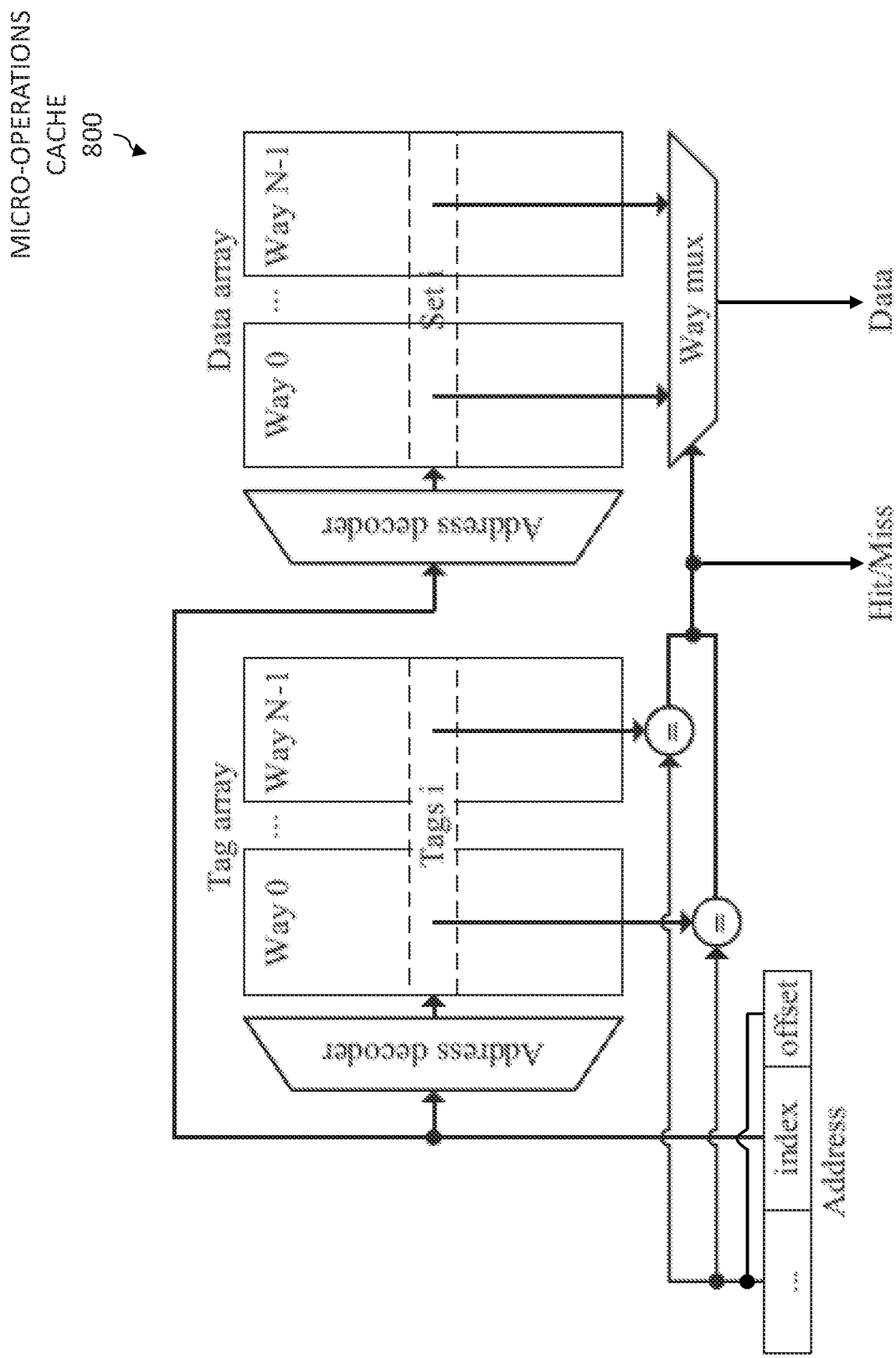
FIG. 8 depicts an example embodiment of an N-way set associative micro-operations cache for use in a processor.

FIG. 8 depicts an example embodiment of an N-way set associative micro-operations cache for use in a processor.

As illustrated in FIG. 8, the UC 800 includes two main building blocks: the tag array and the data array.

The tag array is an N-way set associative array wherein each entry contains IP of a UC line, its validity, size (i.e., IP of last instruction in the block—IP of first instruction in the block), and so forth. An entry needs to keep the "size" so that the processor can increment the IP by the size of the line to look for the next UC line in the sequence. The data array is an N-way set associative array wherein an entry contains the UC line that corresponds to the entry in the tag array. The processor first looks up the tag array by the IP of an instruction. If the tag array is a hit, then the corresponding entry in the data array supplies all the UOPs in the UC line to the execution unit.

For each UC line in the data array, the tag array holds some metadata: the IP-tag and IP-offset bits and the state of the UC line (validity, size, and so forth). Note that the IC tag array entry keeps only the IP-tag since the IC lines are aligned by the fixed size of an IC line, so the IP-offset field is always zero for the identifier of the IC line; however, the UC tag array entry needs to keep both the IP-tag and IP-offset bits since a UC line always starts with the first instruction of an execution sequence and that instruction can be at any offset within an IC line. So, in FIG. 8, both IP-tag and IP-offset are input to the address decoder.

Figure 9A:
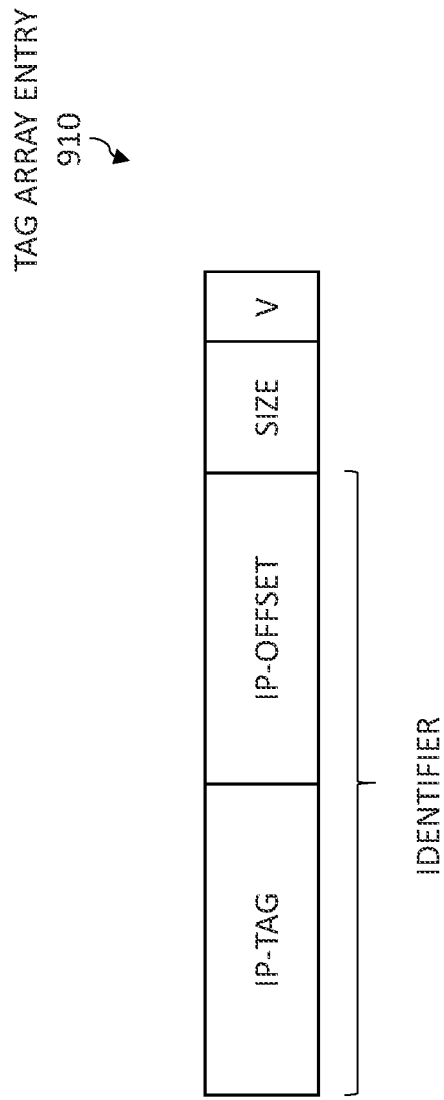
FIGS. 9A and 9B depict example embodiments of a tag array entry and a data array entry in a micro-operations cache.
Figure 9B:
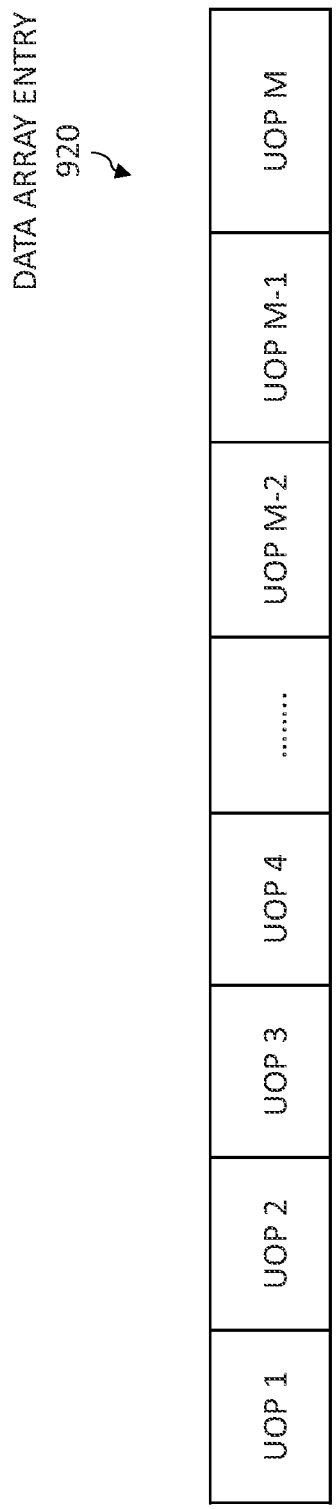

FIGS. 9A and 9B depict example embodiments of a tag array entry and a data array entry in a micro-operations cache.

The tag array entry 910 of FIG. 9A stores metadata associated with the associated data array entry 920 of FIG. 9B. The data array entry 920 holds the UOPs of the instructions included by the UC line.

FIG. 9A depicts the tag array entry 910 associated with the data array entry 920 of FIG. 9B. The tag array entry 910 includes an IP-tag field, an IP-offset field, a Size field, and a V field. The tuple {IP-tag, IP-offset} in the tag array entry 910 is denoted as the "Identifier" of the tag array entry 910 since the tuple is part of the Identifier/IP of the UC line. Whether a way is valid or not is indicated by the "V" bit in the tag array entry 910.

FIG. 9B depicts the data array entry 920 associated with the tag array entry 910 of FIG. 9A. The data array entry 920 holds the UOPs of the instructions included by the UC line. There are a total of M number of UOPs in the exemplary data array entry 920.

To lookup an IP in UC, a set Si in both the data array and the tag array are accessed using the IP-index part; however, to know if a UC line within the set Si corresponds to the given IP, the IP-tag and IP-offset bits must match to an entry in set Si in the tag array. If the IP-tag bits and IP-offset bits of the j-th entry in set Si match, then the correct data is in the j-th UC line of the corresponding data array in set Si (this is called a UC hit). If no IP-tags in set Si match in the tag array, then the requested UC line does not reside in the UC (this is a UC miss). In the case of a UC miss, a request to fetch and decode the instruction must be issued. The construction of the UC lines in the UC as the instructions of the program 600 of FIG. 6 are fetched and decoded by the processor is illustrated with respect to FIGS. 10A-10F.

FIGS. 10A-10F depict example embodiments of cache lines in a micro-operations cache of a processor for the program 600 of FIG. 6.

The processor executes instructions and stores decoded UOPs in UC lines. Initially, there are no valid lines in the UC (i.e., the UC is empty). As instructions are executed, UC lines are allocated. As illustrated in FIGS. 10A-10F, each UC line has metadata associated therewith. The metadata of a UC line includes the IP of the first instruction for which associated UOPs are stored in the UC line, and the UC line is identified by the IP of that first instruction. The metadata of a UC line also includes a "size" parameter, where the "size" means the total number of bytes of the instructions included in the UC line. Here, it is noted that the "size" may be used to increment the IP to search for the next UC line in the execution sequence. It will be appreciated that the metadata of the UC line (namely, the IP-Tag and IP-Offset portion of the Identifier/IP and the size of the UC line) is stored in the Tag Array entry and the UOPs of the UC line are stored in the corresponding entry in the Data Array. Here, references to "UC line that includes the instruction" means the UC line that includes the decoded UOPs of the instruction and references to "offset of an instruction in a UC line" means the offset of the first UOP of the instruction in the UC line. Additionally, the term "intermediate instruction" means an instruction in the UC line at a non-zero offset (i.e., not the first instruction in the UC line).

The processor starts execution from Instr_1 of program 600. Initially, there are no valid lines in the UC (i.e., the UC is empty). Since no UC line is found for the IP of Instr_1, the processor starts fetching and decoding from Instr_1 and allocates a new UC line for storing the decoded UOPs. Assume that the conditional jump instruction cond_jump_100 switches the execution sequence to start from Instr_100. So, the instructions of the instruction sequence from Instr_1 to cond_jump_100 are decoded and stored in a new UC line, referred to as UC Line 1. The UC Line 1 is identified by the IP of Instr_1, and has a size of "x1" (which means the total number of bytes of the UOPs included in the UC Line 1 is equal to x1 bytes). The UC Line 1 is depicted in FIG. 10A.

The processor, after executing cond_jump_100, starts execution from Instr_100. Since no UC line is found for the IP of Instr_100, the processor starts fetching and decoding from Instr_100 and allocates a new UC line for storing the decoded UOPs. After decoding Instr_103 and storing the UOPs for Instr_103 in the UC line, the UC line is full. So, the instructions of the instruction sequence from Instr_100 to Instr_103 are decoded and the associated UOPs are stored in the new UC line, referred to as UC Line 2. The UC Line 2 is identified by the IP of Instr_100, and has a size of "x2" (which means the total number of bytes of the UOPs included in the UC Line 2 is equal to x2 bytes). The UC Line 2 is depicted in FIG. 10B.

The processor then increments the IP (i.e., the IP of Instr_100) by x2 bytes, which results in the IP of Instr_104. The processor continues execution from Instr_104. Since no UC line is found for the IP of Instr_104, the processor starts fetching and decoding from Instr_104 and allocates a new UC line for storing the decoded UOPs. After decoding Instr_106 and storing the UOPs for Instr_106 in the UC line, the UC line is full. So, the instructions of the instruction sequence from Instr_104 to Instr_106 are decoded and the associated UOPs are stored in the new UC line, referred to as UC Line 3. The UC Line 3 is identified by the IP of Instr_104, and has a size of "x3" (which means the total number of bytes of the UOPs included in the UC Line 3 is equal to x3 bytes). The UC Line 3 is depicted in FIG. 10C.

The processor then increments the IP (i.e., the IP of Instr_104) by x3 bytes, which results in the IP of Instr_107. The processor then starts execution from Instr_107. Since no UC line is found for the IP of Instr_107, the processor starts fetching and decoding from Instr_107 and allocates a new UC line for storing the decoded UOPs. Assume that, after executing cond_jump_25, the processor switches the execution sequence to start from Instr_25. So, the instructions of the instruction sequence from Instr_107 to cond_jump_25 are decoded and the associated UOPs are stored in the new UC line, referred to as UC Line 4. The UC Line 4 is identified by the IP of Instr_107, and has a size of "x4"

(which means the total number of bytes of the UOPs included in the UC Line 4 is equal to x4 bytes). The UC Line 4 is depicted in FIG. 10D.

The processor then starts execution from Instr_25. Since no UC line is found for the IP of Instr_25, the processor starts fetching and decoding from Instr_25 and allocates a new UC line for storing the decoded UOPs. The instruction jump_100 switches the execution sequence to start from Instr_100. So, the instructions of the instruction sequence from Instr_25 to jump_100 are decoded and the associated UOPs are stored in the new UC line, referred to as UC Line 5. The UC Line 5 is identified by the IP of Instr_102, and has a size of "x5" (which means the total number of bytes of the UOPs included in the UC Line 5 is equal to x5 bytes). The UC Line 5 is depicted in FIG. 10E.

The processor then starts execution from Instr_100. The processor, since UC Line 2 already exists for the IP of Instr_100, the processor fetches all of the UOPs from UC Line 2 and supplies the UOPs from UC Line 2 to the execution unit.

The processor then increments the IP (i.e., the IP of Instr_100) by the size of UC Line 2 (namely, by x2 bytes), which results in the IP of Instr_104, so the processor fetches all UOPs from UC Line 3 (which is identified by the IP of Instr_104) and supplies the UOPs from UC Line 3 to the execution unit.

The processor then increments the IP (i.e., the IP of Instr_104) by the size of UC Line 3 (namely, by x3 bytes), which results in the IP of Instr_107, so the processor fetches all UOPs from UC Line 4 (which is identified by the IP of Instr_107) and supplies the UOPs from UC Line 4 to the execution unit.

The processor, assuming that the execution of cond_jump_25 results in continuation of the execution sequence, increments the IP (i.e., the IP of Instr_107) by the size of UC Line 4 (namely, by x4 bytes), which results in the IP of Instr_109. Since no UC line is found for the IP of Instr_109, the processor starts fetching and decoding from Instr_109 and allocates a new UC line for storing decoded UOPs. Assume that, after executing cond_jump_104, the processor switches the execution sequence to start from Instr_104. So, the instructions of the instruction sequence from Instr_109 to cond_jump_104 are decoded and the associated UOPs are stored in the new UC line, referred to as UC Line 6. The UC Line 6 is identified by the IP of Instr_109, and has a size of "x6" (which means the total number of bytes of the UOPs included in the UC Line 6 is equal to x6 bytes). The UC Line 6 is depicted in FIG. 10F.

The processor, assuming that the execution of cond_jump_104 results in switching of the execution sequence to start from Instr_104, starts execution from Instr_104. The processor, since the UC Line 3 already exists for the IP of Instr_104, fetches all UOPs from UC Line 3 (which is identified by the IP of Instr_104) and supplies the UOPs from UC Line 3 to the execution unit.

The processor then increments the IP (i.e., the IP of Instr_104) by the size of UC Line 3 (namely, by x3 bytes), which results in the IP of Instr_107, so the processor fetches all UOPs from UC Line 4 (which is identified by the IP of Instr_107) and supplies the UOPs from UC Line 4 to the execution unit.

Various example embodiments may be configured to provide, within a processor, a UC supporting use of affinity groups such that all UC lines that belong to a common execution sequence may be associated with a common affinity group in a manner enabling all of the UC lines that belong to the common execution sequence to be accessed and provided to the execution unit of the processor together, thereby providing significant improvements in processor performance and efficiency when executing a program. In a processor, the UC is a key component that determines the performance and power efficiency of the processor while the processor executes programs. The reduction of clock cycles to fetch UOPs from the UC improves the fetch bandwidth as well as power consumption. Without use of affinity groups, when an execution sequence spans across P number of UC lines in the same set of an N-way set associative UC, then P number of lookups are needed to fetch the UOPs of the entire execution sequence. Various example embodiments of a UC supporting use of affinity groups support fetching of all UC lines of a single execution sequence, located in the same set of an N-way set associative UC, in the same clock cycle, thereby increasing the fetch bandwidth by a factor of P and reducing power consumption by a factor of P. For example, in the execution of program 600 of FIG. 6 as discussed above the UC lines 2, 3, and 4 contain the UOPs of the execution sequence starting from Instr_100 to cond_jump_25. If all instructions in this sequence share the same IP-index then all three UC lines will be located in the same set. The use of an affinity group to associate these UC lines enables all three UC lines to be fetched together in the same clock cycle, thereby increasing the fetch bandwidth by a factor of three and decreasing power consumption by a factor of three, both of which are significant gains in processor performance and efficiency. It will be appreciated that affinity grouping of UC lines in a set of an N-way set associative UC may be further understood by way of reference to FIG. 11.

Figure 11:
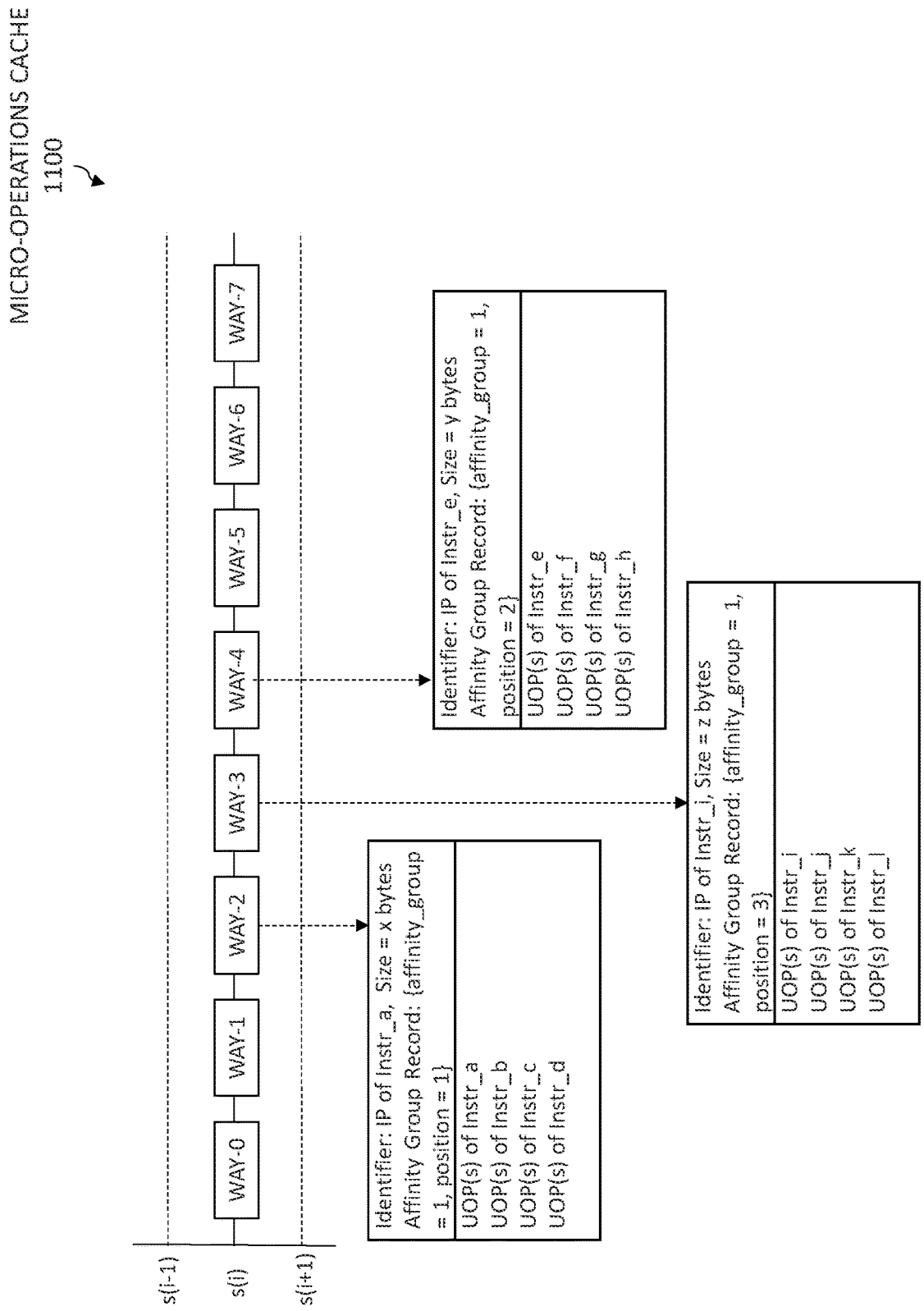
FIG. 11 depicts an example embodiment of affinity grouping of cache lines in a set of an N-way set associative UC.

FIG. 11 depicts an example embodiment of affinity grouping of UC lines in a set of an N-way set associative UC.

In FIG. 11, for the UC 1100, a set of UC lines in a set (i.e., ways in the set) that belong to the same execution sequence are marked as members of a common affinity group. The affinity group is assigned an affinity group identifier (e.g., an affinity group number or other suitable identifier) that identifies the affinity group. In the affinity group, for each member UC line in the affinity group, the member UC line is assigned a position within the affinity group based on the order of occurrence of the member UC line in the execution sequence. In the affinity group, for each member UC line of the affinity group, the member UC line maintains a tuple {affinity_group, position}, where 'affinity_group' is the affinity group identifier of the affinity group and 'position' is the index of the member UC line in the order of occurrence in the affinity group. This tuple, which is referred to herein as an "affinity group record", may be stored in the metadata portion of the UC line.

In FIG. 11, after decoding an instruction of an execution sequence, when the first UC line (i.e., the current UC line in which the previous instruction in the execution sequence is stored) is full, then a second UC line is allocated to store the instruction. The affinity_group of the second UC line is set as the affinity_group of the first UC line. The position of the second UC line is set as the value of the position of the first UC line incremented by one. In other words: (1) Affinity Group Record of first UC Line in way w1=>{affinity_group=g, position=p} and (2) Affinity Group Record of second UC Line in way w2=>{affinity_group=g, position=p+1}. When lookup of an IP in UC finds a matching first UC line, it fetches the UOPs from all UC lines which are part of the affinity group, including the first UC line and all subsequent UC lines in the same affinity group. As a result, fetching of all of the related UC lines can be done in the same clock cycle.

In FIG. 11, UC lines are organized as an 8-way set associative array. Ways 2, 4, and 3 are member UC lines of affinity group 1 in the order of occurrence for the sequence of instructions Instr_a to Instr_1. So ways 2, 4, and 3 are assigned positions 1, 2, and 3, respectively. If an execution sequence starts at the IP of Instr_a, then UC Lines 2, 4, and 3 are fetched in the same clock cycle and the UOPs are sequenced by the positions of UC Lines 2, 4, and 3 in the affinity group. If an execution sequence starts at the IP of Instr_e, then UC Lines 4 and 3 are fetched in the same clock cycle and the UOPs are sequenced by the positions of UC Lines 4 and 3 in the affinity group. If an execution sequence starts at the IP of Instr_i, then UC line 3 is fetched in the clock cycle.

It will be appreciated that affinity grouping of UC lines in a set of an N-way set associative UC may be further understood by considering use of affinity groups during execution of the program 600 of FIG. 6, which is presented with respect to FIGS. 12A-12F.

FIGS. 12A-12F depict example embodiments of cache lines, in a micro-operations cache that supports affinity grouping, for the program of FIG. 6.

The processor starts execution from Instr_1. It is assumed that, at this point, there are no valid blocks in the UC (i.e., the UC is empty). The processor, since no UC line is found for the IP of Instr_1, starts fetching and decoding from Instr_1 and allocates a new UC line for storing the decoded UOPs. Assume that the conditional jump instruction cond_jump_100 switches the execution sequence to start from Instr_100. So, the instructions of the instruction sequence from Instr_1 to cond_jump_100 are decoded and the associated UOPs are stored in the new UC line, referred to as UC Line 1. The UC Line 1 is identified by the IP of Instr_1. Since this UC line begins anew execution sequence, an affinity group is allocated with the position as "1". Here, assume that the affinity group value used to identify the affinity group is "1". The UC Line 1 is depicted in FIG. 12A.

The processor, after executing cond_jump_100, starts execution from Instr_100. The processor, since no UC Line is found for the IP of Instr_100 as an identifier, the processor starts fetching and decoding from Instr_100 and allocates a new UC Line for storing the decoded UOPs. After decoding and storing Instr_103 into the UC line, the UC line is full. So, the instructions of the instruction sequence from Instr_100 to Instr_103 are decoded and the associated UOPs are stored in the new UC line, referred to as UC Line 2. The UC Line 2 is identified by the IP of Instr_100. Since this UC line begins a new execution sequence, an affinity group is allocated with the position as "1". Here, assume that the affinity group value used to identify the affinity group is "2". The UC Line 2 is depicted in FIG. 12B.

The processor then increments the IP (i.e., the IP of Instr_100) by x2 bytes, which results in the IP of Instr_104. The processor continues execution from Instr_104. The processor, since no UC line is found for the IP of Instr_104, starts fetching and decoding from Instr_104 and allocates a new UC line for storing the decoded UOPs. After decoding and storing Instr_106, the UC line is full. So, the instructions of the instruction sequence from Instr_104 to Instr_106 are decoded and the associated UOPs are stored in the new UC Line, referred to as UC Line 3. The UC Line 3 is identified by the IP of Instr_104. Since this UC line is a continuation of the execution sequence from UC Line 2, so the affinity group is set to "2" and the position is set to "2". The UC Line 3 is depicted in FIG. 12C.

The processor then increments the IP (i.e., the IP of Instr_104) by x3 bytes, which results in the IP of Instr_107. The processor, since no UC line is found for the IP of Instr_107, starts fetching and decoding from Instr_107 and allocates anew UC line for storing the decoded UOPs. Assume that, after executing cond_jump_25, the processor switches the execution sequence to start from Instr_25. So, the instructions of the instruction sequence from Instr_107 to cond_jump_25 are decoded and stored in the new UC line, referred to as UC Line 4. The UC Line 4 is identified by the IP of Instr_107. Since this UC line is a continuation of the execution sequence from UC Line 3, so the affinity group is set to "2" and the position is set to "3". The UC Line 4 is depicted in FIG. 12D.

The processor then starts execution from Instr_25. The processor, since no UC line is found for the IP of Instr_25, starts fetching and decoding from Instr_25 and allocates a new UC Line for storing the decoded UOPs. The instruction jump_100 switches the execution sequence to start from Instr_100. So, instructions of the instruction sequence from Instr_25 to jump_100 are decoded and stored in the new UC Line, referred to as UC Line 5. The UC Line 5 is identified by the IP of Instr_25. Since this UC line begins a new execution sequence, an affinity group is allocated with the position as "1". Here, assume that the affinity group value used to identify the affinity group is "3". The UC Line 5 is depicted in FIG. 12E.

The processor then starts execution from Instr_100. The processor, since UC Line 2 already exists for the IP of Instr_100, fetches all UOPs from UC Line 2 and any subsequent UC lines in the set with the same affinity group. In this case, UC Lines 3 and 4 are the subsequent UC lines. So, UOPs from UC Lines 2, 3, and 4 are supplied to the execution unit in the same clock cycle.

The processor then continues the execution sequence (e.g., assume that the execution of cond_jump_25 results in continuation of the execution sequence). The processor then increments the IP by the total sizes of UC Lines 2, 3, and 4, which results in the IP of Instr_109.

The processor, since no UC line is found for the IP of Instr_109, starts fetching and decoding from Instr_109 and allocates a new UC Line for storing the decoded UOPs. Assume that, after executing cond_jump_104, the processor switches the execution sequence to start from Instr_104. So, instructions of the instruction sequence from Instr_109 to cond_jump_104 are decoded and stored in the new UC line, referred to as UC Line 6. The UC Line 6 is identified by the IP of Instr_109. Since this UC line begins anew execution sequence (although sequentially executed after UC Line 5, but separated by a conditional branch), an affinity group is allocated with the position as "1". Here, assume that the affinity group value used to identify the affinity group is "4". The UC Line 6 is depicted in FIG. 12F.

The processor, assuming that execution of cond_jump_104 results in switching of the execution sequence to start from Instr_104, starts execution from Instr_104. The processor, Since UC Line 3 already exists for the IP of Instr_104, fetches all UOPs from UC Line 3 and the subsequent UC lines in the same affinity group. In this case, UC Line 4 is the only subsequent UC line. So, UOPs from UC Line 3 and UC Line 4 are supplied to the execution unit in the same clock cycle.

Figure 13:
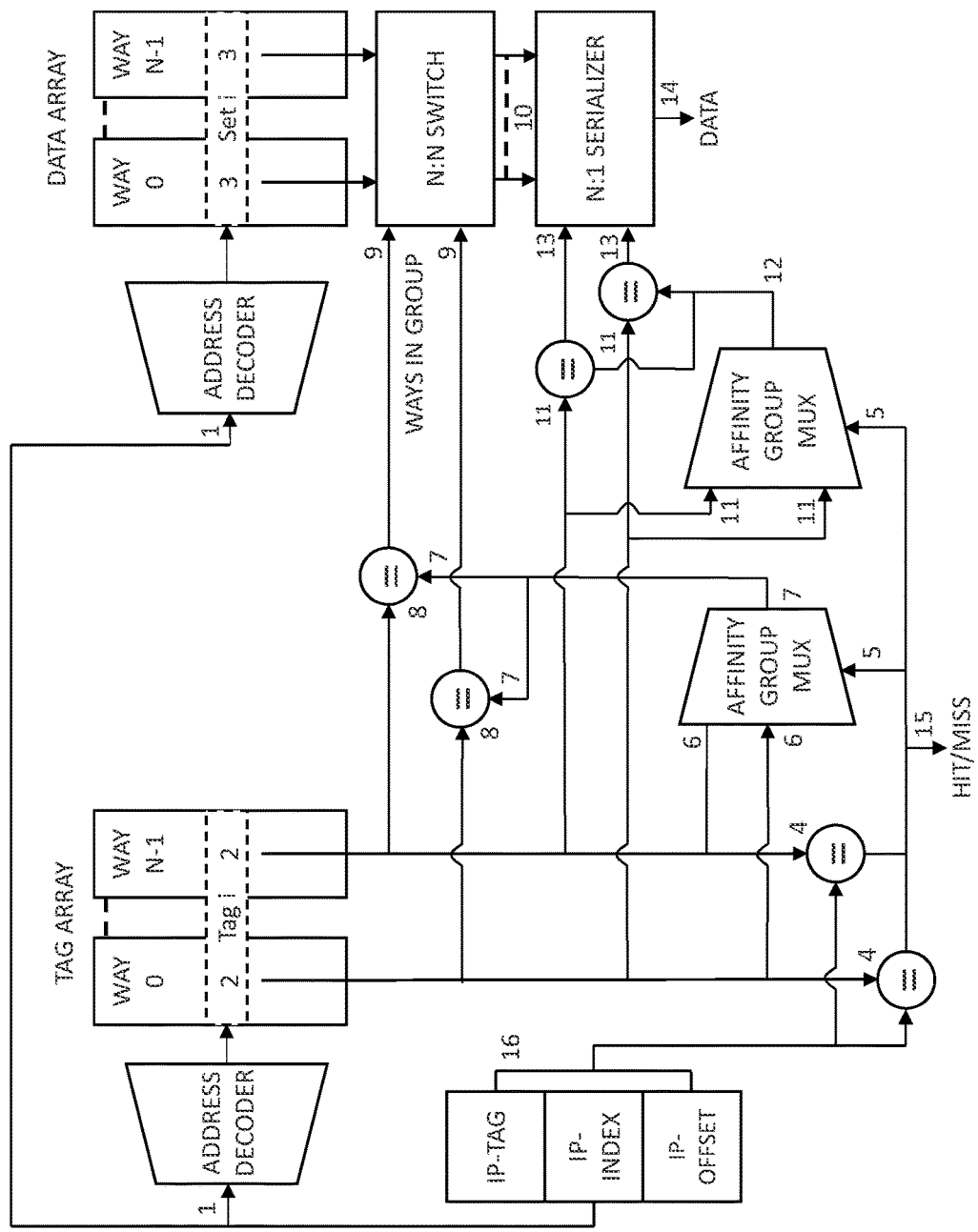
FIG. 13 depicts an example embodiment of a micro-operations cache, organized as an N-way set associative cache, that supports affinity grouping.

FIG. 13 depicts an example embodiment of a micro-operations cache, organized as an N-way set associative cache, which supports affinity grouping.

The micro-operations cache 1300, which is organized as an N-way set associative cache, supports affinity grouping.

The processor, when lookup of an IP in the UC finds a matching first UC line, fetches the UOPs from the first UC line and all subsequent UC lines in the same affinity group as the first UC line. The fetching of the UOPs from all of the UC lines in the affinity group is done in the same clock cycle. This process is illustrated in FIG. 13, with the signals being marked with integer numbers. This process is discussed further below.

At clock cycle T, the IP-index of an instruction is input into address decoders of the tag array and the data array in parallel (Signal 1).

The Address Decoders activate the set in tag array and data array that corresponds to the IP-index. All ways in the set are read and generated as output within clock cycle T. Signal 2 is the output from all ways in the tag array and Signal 3 is the output from all ways in the data array.

IP-tag and IP-offset from each way in the tag array (Signal 4) is compared against the corresponding fields of the input IP (Signal 16). The outputs from each comparison are aggregated into two output signals—hit or miss (Signal 15) and way number if a way is hit (Signal 5).

The affinity group field from each way in the tag array (Signal 6) is input to an N:1 multiplexer, which generates the affinity group of the way that is hit as the output (Signal 7). The indication of the way that is hit comes from Signal 5.

The affinity group fields from each way in the tag array (Signal 8) are compared with the affinity group of the way that is hit (Signal 7). The output from each comparison (Signal 9) is input to a N:N switch. The N:N switch switches those ways from the data array as output (Signal 10), which are active in Signal 9 (i.e., the ways in the matching affinity group).

The position field from each way in the tag array is input (Signal 11) to an N:1 multiplexer, which generates the position of the way that is hit (based on Signal 5) as the output (Signal 12).

The position field from each way in the tag array (Signal 11) is subtracted from the position of the way that is hit (Signal 12) such that way positions higher than and equal to the Signal 12 only remain valid. The valid positions are generated as the output from the subtractors (Signal 13).

The N:1 serializer serializes the ways from the data array received from N:N switch (Signal 10) based their respective positions received in Signal 13. The UOPs from the serialized ways are generated as the final output (Signal 14).

Figure 14A:
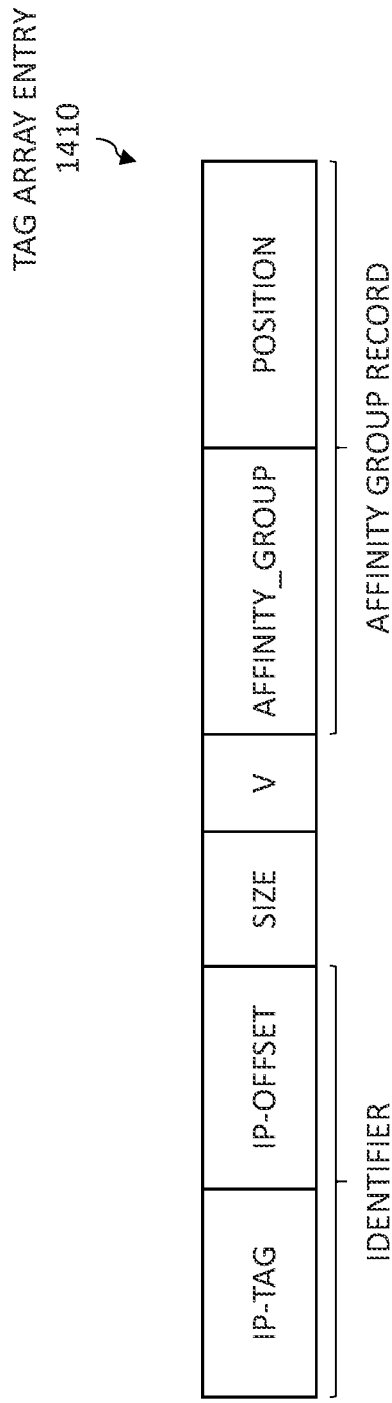
FIGS. 14A and 14B depict example embodiments of a tag array entry and a data array entry in a micro-operations cache configured to support affinity grouping.
Figure 14B:
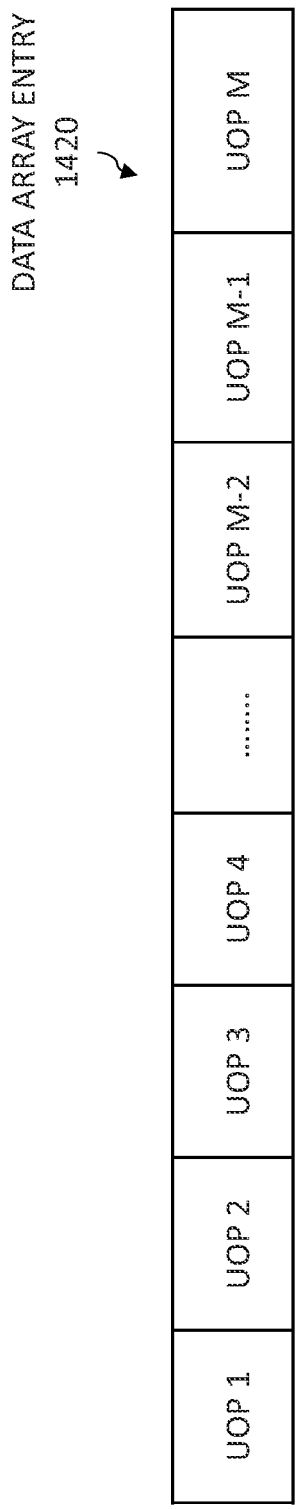

FIGS. 14A and 14B depict example embodiments of a tag array entry and a data array entry in a micro-operations cache configured to support affinity grouping.

In FIG. 14A, the tag array entry 1410, which is part of an N-way set associative array, at least includes the IP of a UC line, the validity of the UC line, the size of the UC line (i.e., IP of last instruction in the block—IP of first instruction in the block), and an Affinity Group Record for the UC line. The Affinity Group Record for the UC line includes an Affinity Group field that includes the affinity group identifier of the affinity group and a Position field which indicates the position within the affinity group.

In FIG. 14B, the data array entry 1420, which is part of an N-way set associative array, includes the UC line corresponding to the tag array entry 1410. The data array entry 1420 includes slots for M number of UOPs.

When a first new UC line is to be allocated to store UOPs of an instruction, an empty/unused way in the tag array is selected in the set that corresponds to the IP-index of the instruction. If no empty way exists in the set, then an existing way is evicted based on an eviction policy. The selected way is the tag array entry in the tag array for the new UC line. The IP-tag and IP-offset of the instruction are programmed as the Identifier of the tag array entry of the tag array. The UOPs of the instruction are stored in the data array entry corresponding to the tag array entry.

If the instruction is an intermediate instruction of an execution sequence and the second UC line that includes the previous instructions in the execution sequence is a way in the same set, then the affinity group in the tag array entry in the first UC line is inherited from the affinity group in the tag array entry in the second UC line. The position in the tag array entry in the second UC line is set by incrementing the position in the tag array entry in the first UC line.

If the instruction is not an intermediate instruction of an execution sequence then a new/unused affinity group value is set in the affinity group field in the tag array entry of the first UC line. The position of the tag array entry in the second UC line is set as one.

Figure 15:
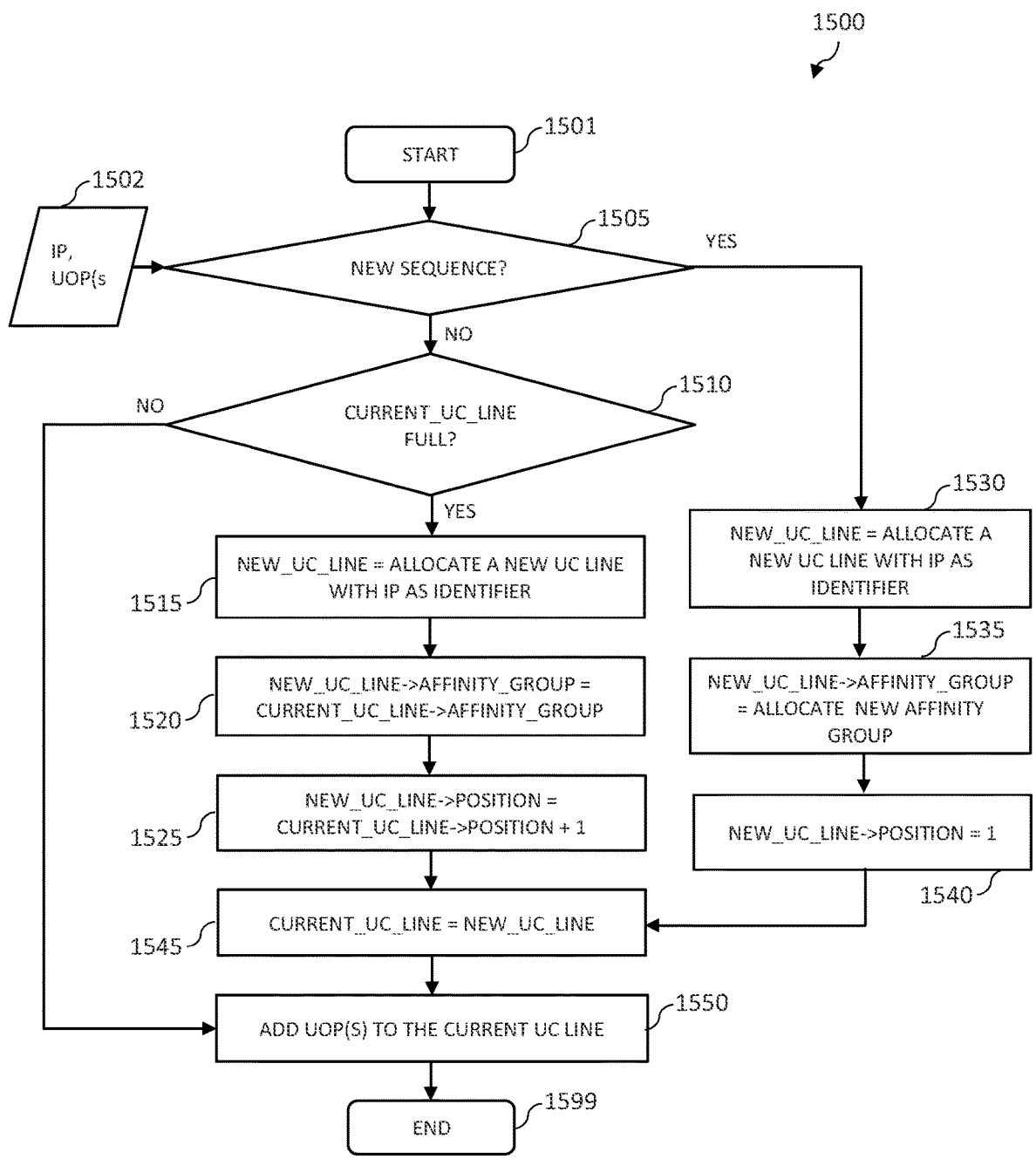
FIG. 15 depicts an example embodiment of a method for writing micro-operations to a micro-operations cache configured to support use of affinity groups.

FIG. 15 depicts an example embodiment of a method for writing micro-operations to a micro-operations cache configured to support use of affinity groups. It will be appreciated that, although primarily presented as being performed serially, at least a portion of the blocks of method 1500 may be performed contemporaneously or in a different order than as presented in FIG. 15. At block 1501, the method 1500 begins. The inputs to the method, as indicated at block 1502, include the IP of an instruction and one or more UOPs of the decoded instruction. Block 1505 checks if the instruction is the beginning of a new sequence. If the instruction is not the beginning of a new sequence then the method 1500 proceeds to block 1510, otherwise the method 1500 proceeds to block 1530. Block 1510 checks if the current UC line is full. The current UC line means the UC line wherein UOPs of previous instructions in the sequence had been stored. If the UC line is not full then the method 1500 proceeds to block 1550, otherwise the method 1500 proceeds to block 1515. Block 1515 allocates a new UC line with the input IP as its identifier, and the method 1500 then proceeds to block 1520. Block 1520 sets the value in the affinity_group field of the UC line to the value in the affinity_group field of the current UC line, and the method 1500 then proceeds to block 1525. Block 1525 sets the position field of the new UC line by incrementing the position of the current UC line by one, and the method 1500 then proceeds to block 1545. Block 1530 allocates a new UC line with the input IP as its identifier, and the method 1500 then proceeds to block 1535. Block 1535 allocates a new/unused affinity group value and sets the value in the affinity_group field of the UC line to the new/unused affinity group value, and the method 1500 then proceeds to block 1540. Block 1540 sets the position field of the new UC line to one, and the method 1500 then proceeds to block 1545. Block 1545, which may be entered from block 1525 or block 1540, sets the current UC line as the new UC line, and the method 1500 then proceeds to block 1550. Block 1550 appends the UOP(s) of the instruction into the current UC Line. From block 1550, the method 1500 proceeds to block 1599 where the method 1500 ends.

Figure 16:
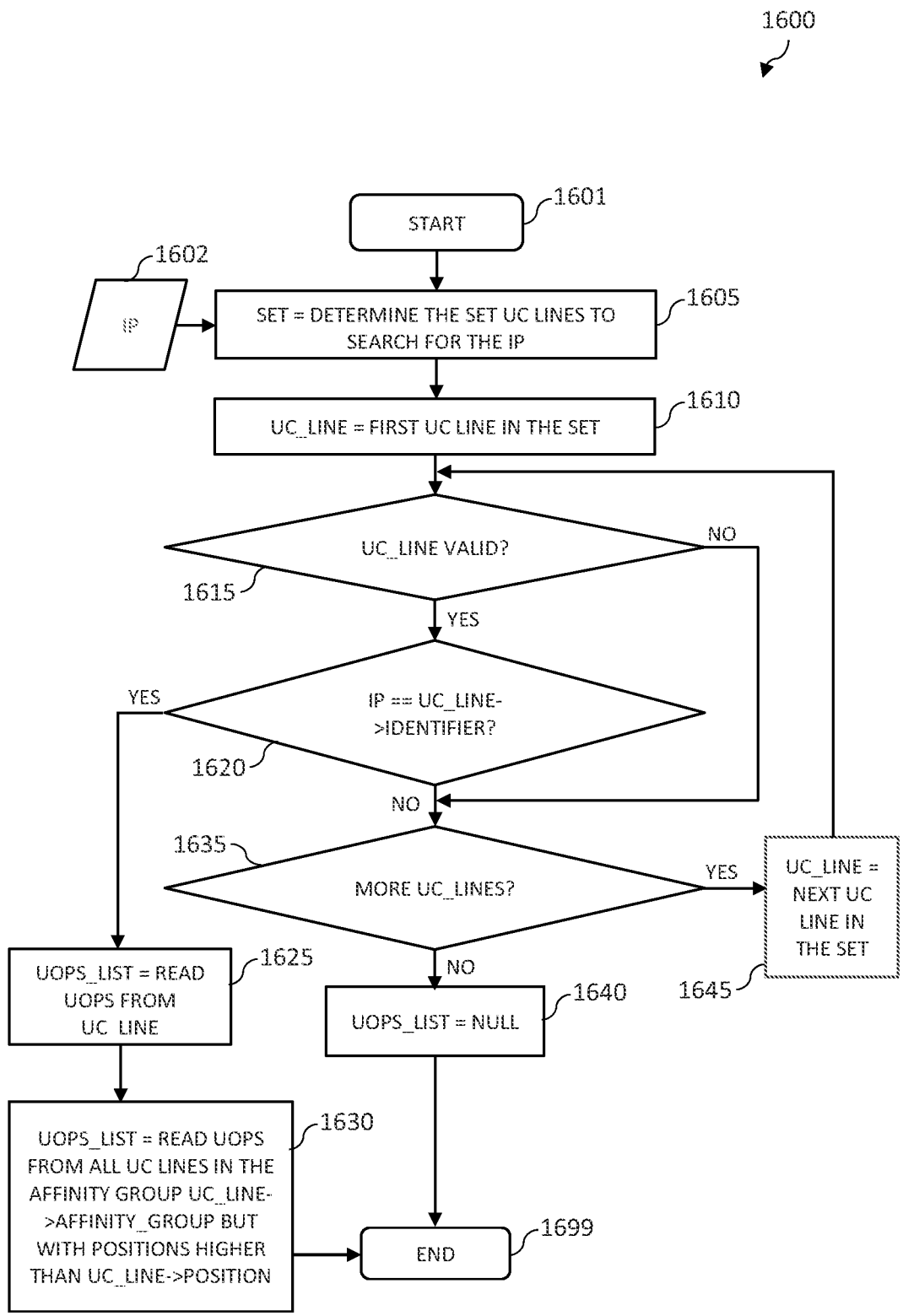
FIG. 16 depicts an example embodiment of a method for reading micro-operations from a micro-operations cache configured to support use of affinity groups.

FIG. 16 depicts an example embodiment of a method for reading micro-operations from a micro-operations cache configured to support use of affinity groups. The implementation of the read operation in the UC performs a lookup of UOPs for the sequence starting with an IP. It will be appreciated that, although primarily presented as being performed serially, at least a portion of the blocks of method 1600 may be performed contemporaneously or in a different order than as presented in FIG. 16. At block 1601, the method 1600 begins. The inputs to the method, as indicated at block 1602, include the IP of an instruction to be looked up in the UC. Block 1605 finds the set of UC lines that may store UC lines for the IP. For example, when the UC is implemented as N-way set associative array, the set includes the ways in the set indexed by the IP-Index portion of the IP. From block 1605, the method 1600 proceeds to block 1610. Block 1610 retrieves the first UC line in the set and the method 1600 then proceeds to block 1615. Block 1615 checks if the UC line is valid. If the UC line is not valid then the method 1600 proceeds to block 1635, otherwise the method 1600 proceeds to block 1620. Block 1620 checks if the IP is the identifier of the UC line. If IP is the identifier of the UC line then the method 1600 proceeds to block 1625, otherwise the method 1600 proceeds to block 1635. Block 1625 reads the UOPs of the UC line into an output buffer (UOPs List) and the method 1600 then proceeds to block 1630. Block 1630 reads the UOPs from all UC lines in the set that belong to the same affinity group as the UC line and that have positions higher than the UC line in the affinity group. If such UC lines are found, then the UOPs from those UC lines are appended to the output buffer by the order of their positions. It is noted that block 1630 may be implemented as presented in FIG. 17. From block 1630, the method 1600 proceeds to block 1699, where the method 1600 ends. Block 1635 checks if there are more UC lines to be looked up for the IP in the set of UC lines. If there are no more UC lines to be looked up for the IP in the set of UC lines then the method 1600 proceeds to block 1640, otherwise the method 1600 proceeds to block 1645. Block 1640 declares a failure to lookup the UOPs for the IP and the method 1600 then proceeds to block 1699 where the method 1600 ends. Block 1645 retrieves the next UC line in the set of UC lines and the method 1600 then returns to block 1615 to repeat all subsequent steps for the next UC line. At block 1699, the method 1600 ends.

Figure 17:
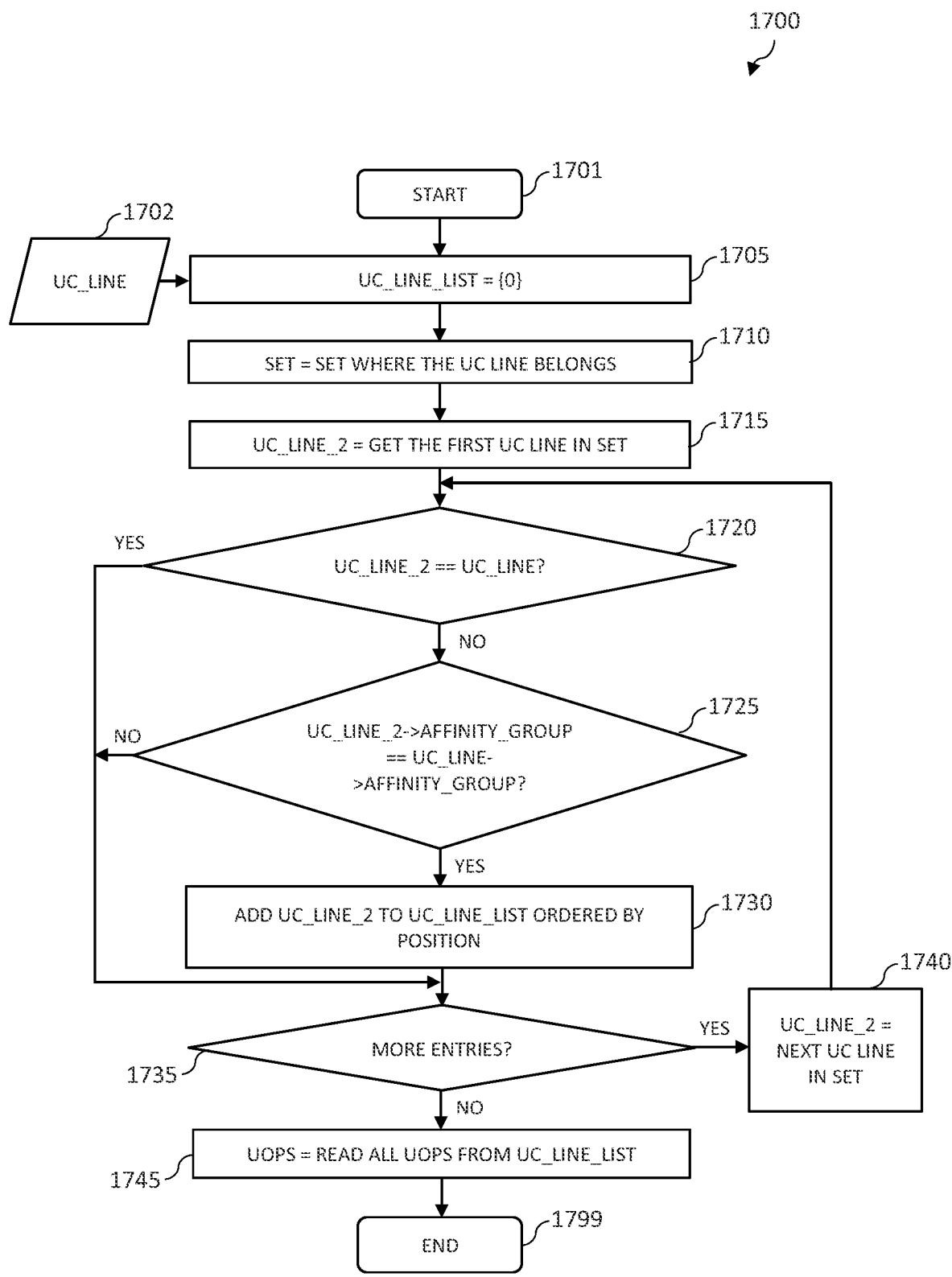
FIG. 17 depicts an example embodiment of a method for reading micro-operations from cache lines in an affinity group.

FIG. 17 depicts an example embodiment of a method for reading micro-operations from cache lines in an affinity group. It will be appreciated that the method 1700 of FIG. 17 may be used to provide block 1630 of the method 1600 of FIG. 16. It will be appreciated that, although primarily presented as being performed serially, at least a portion of the blocks of method 1700 may be performed contemporaneously or in a different order than as presented in FIG. 17. At block 1701, the method 1700 begins. The input to the method, as indicated at block 1702, includes the lead UC line of the set of UC lines of the affinity group (the lead line of which the subsequent UC lines in the affinity group are to be read). Block 1705 initializes an empty list of UC lines and the method 1700 then proceeds to block 1710. Block 1710 finds the set to which the UC line belongs, and the method 1700 then proceeds to block 1715. Block 1715 retrieves the first UC line in the set and the method 1700 then proceeds to block 1720. Block 1720 checks if the UC line is the input UC line. If the UC line is the input UC line then the method 1700 proceeds to block 1735, otherwise the method 1700 proceeds to block 1725. Block 1725 checks if the affinity group of the UC line is the same as the affinity group of the input UC line. If the affinity group of the UC line is not the same as the affinity group of the input UC line then the method 1700 proceeds to block 1735, otherwise the method 1700 proceeds to block 1730. Block 1730 adds the UC line into the list of UC lines in the order of its position, and the method 1700 then proceeds to block 1735. Block 1735 checks if there are more UC lines in the set to be processed. If there are not more UC lines in the set to be processed then the method 1700 proceeds to block 1745, otherwise the method 1700 proceeds to block 1740. Block 1740 sets the UC line to the next UC line in the set, and the method 1700 then returns to block 1720. Block 1745 reads the UOPs from the list of UC lines, and the method 1700 then proceeds to block 1799. At block 1799, the method 1700 ends.

Figure 18:
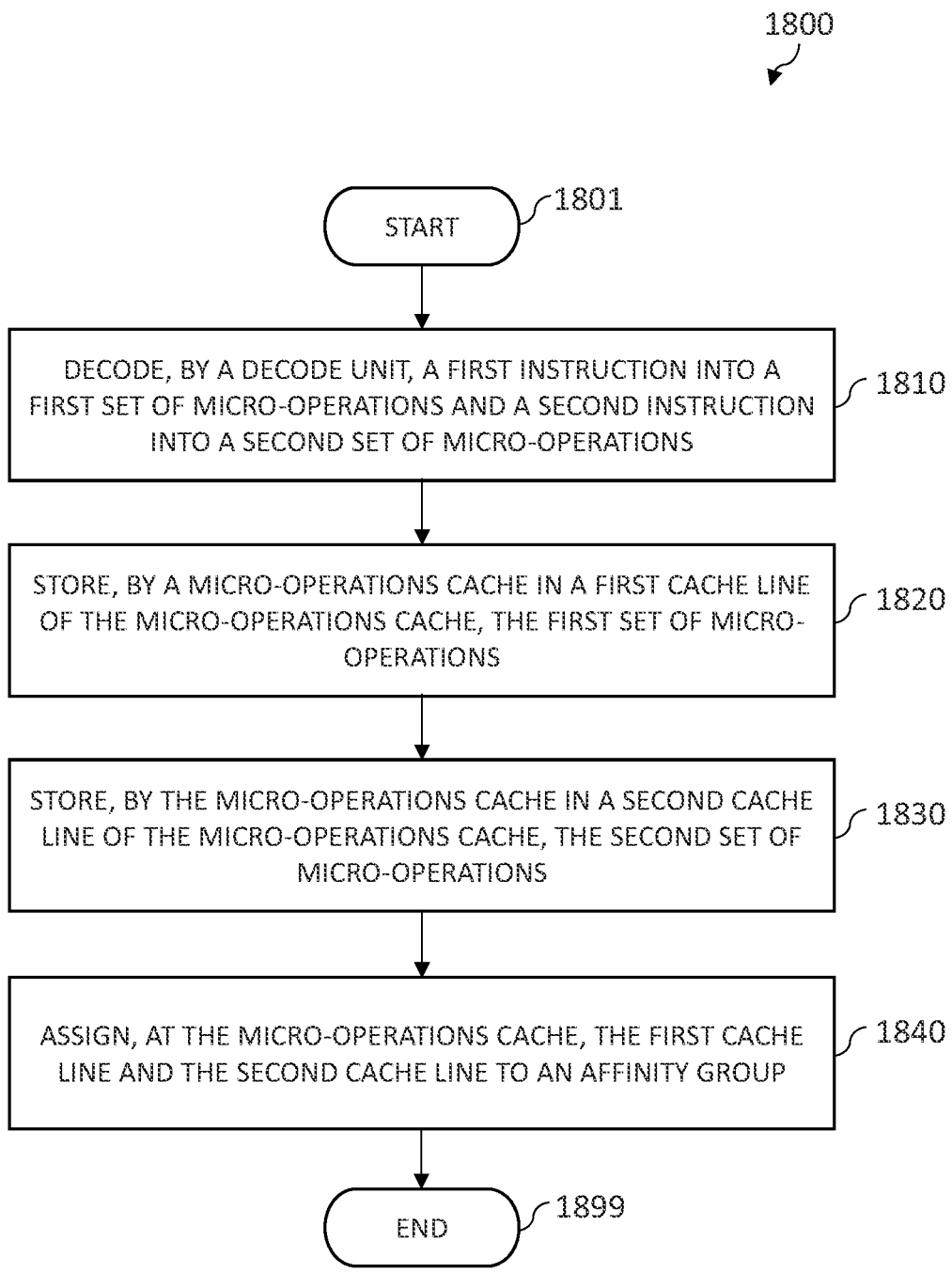
FIG. 18 depicts an example embodiment of a method for supporting affinity groups for a micro-operations cache of a processor.

FIG. 18 depicts an example embodiment of a method for supporting affinity groups for a micro-operations cache of a processor. It will be appreciated that, although primarily presented herein as being performed serially, at least a portion of the functions of method 1800 may be performed contemporaneously or in a different order than as presented in FIG. 18. At block 1801, the method 1800 begins. At block 1810, decode, by a decode unit, a first instruction into a first set of micro-operations and a second instruction into a second set of micro-operations. At block 1820, store, by a micro-operations cache in a first cache line of the micro-operations cache, the first set of micro-operations. At block 1830, store, by the micro-operations cache in a second cache line of the micro-operations cache, the second set of micro-operations. At block 1840, assign, at the micro-operations cache, the first cache line and the second cache line to an affinity group. At block 1899, the method 1800 ends.

Figure 19:
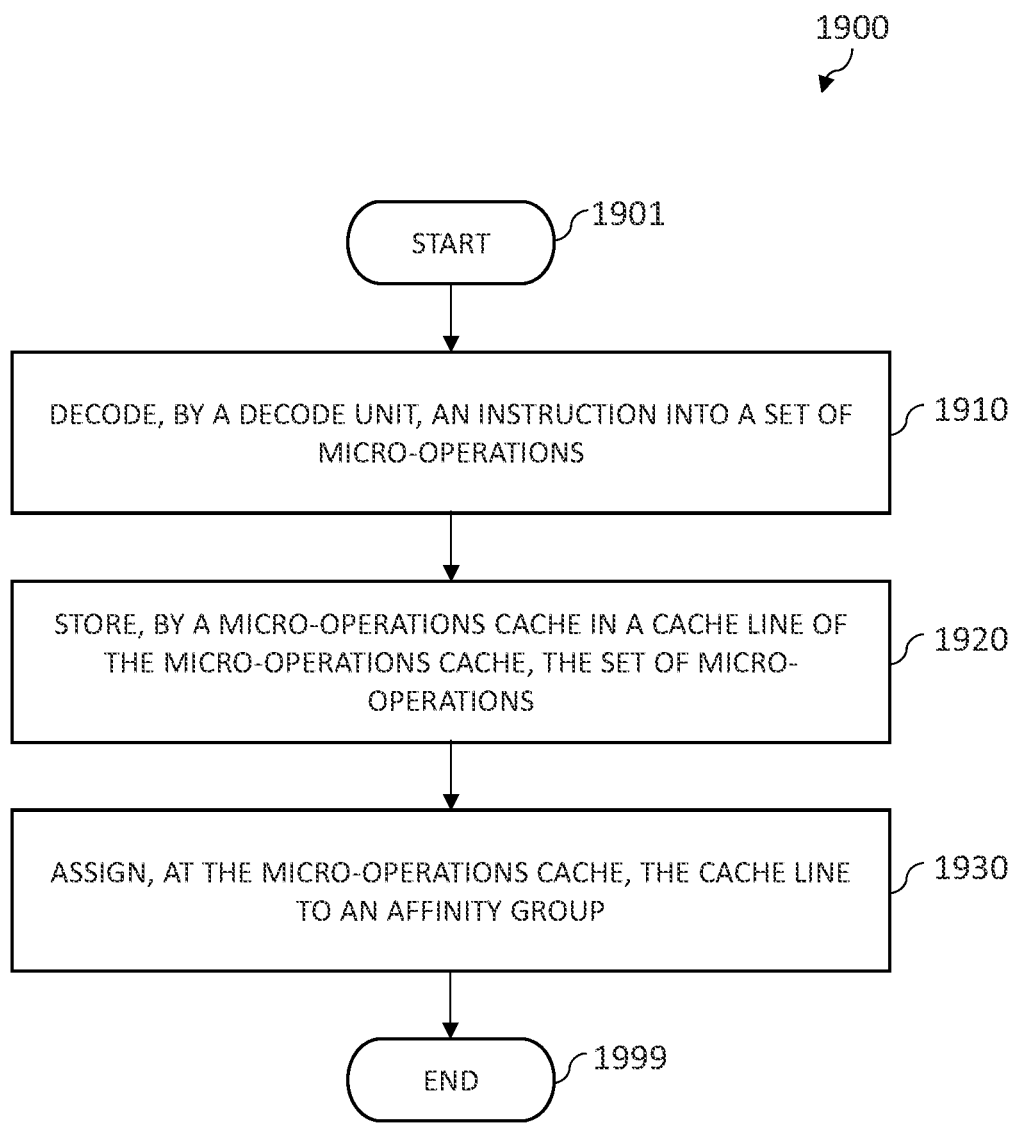
FIG. 19 depicts an example embodiment of a method for supporting affinity groups for a micro-operations cache of a processor.

FIG. 19 depicts an example embodiment of a method for supporting affinity groups for a micro-operations cache of a processor. It will be appreciated that, although primarily presented herein as being performed serially, at least a portion of the functions of method 1900 may be performed contemporaneously or in a different order than as presented in FIG. 19. At block 1801, the method 1800 begins. At block 1910, decode, by a decode unit, an instruction into a set of micro-operations. At block 1920, store, by a micro-operations cache in a cache line of the micro-operations cache, the set of micro-operations. At block 1930, assign, at the micro-operations cache, the cache line to an affinity group. At block 1999, the method 1900 ends.

Figure 20:
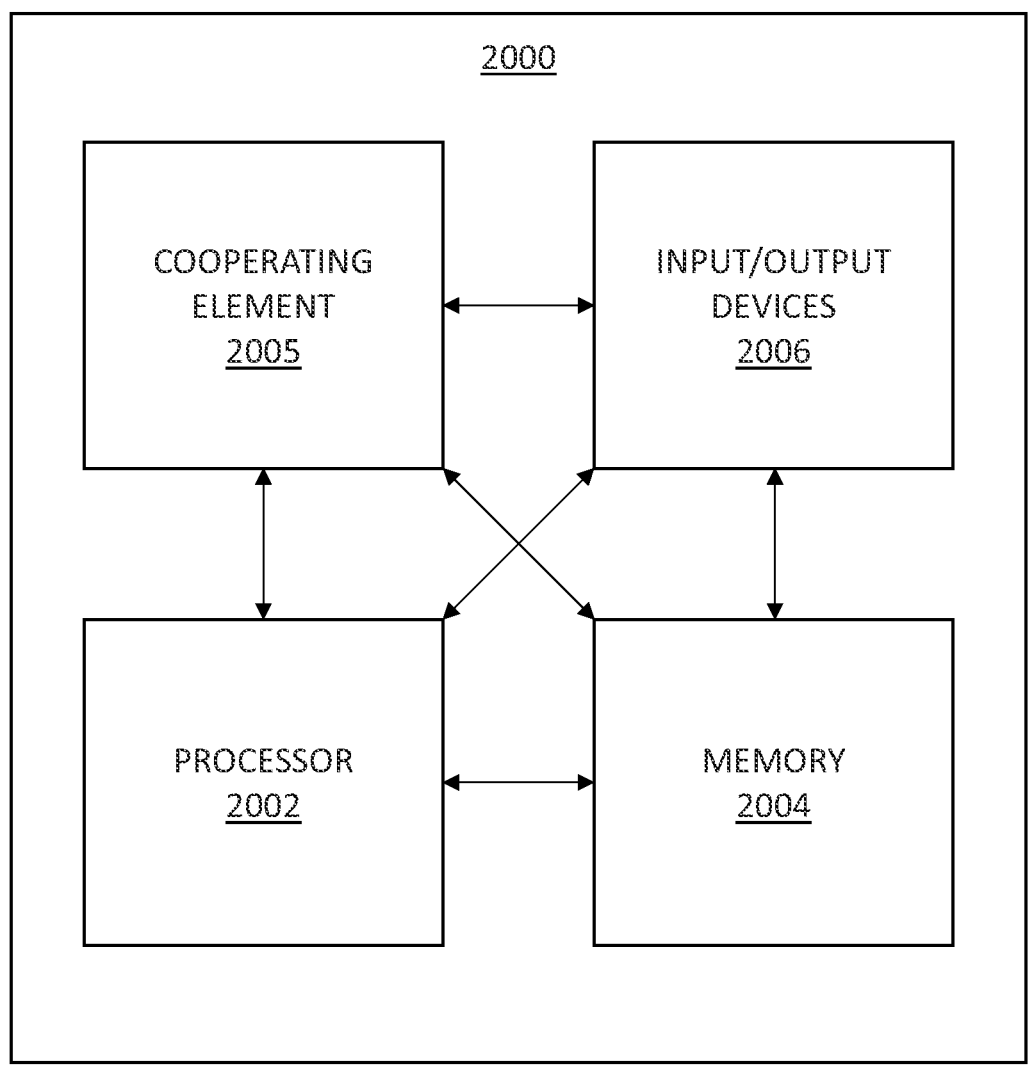
FIG. 20 depicts an example embodiment of a computer suitable for use in performing various functions presented herein.

FIG. 20 depicts an example embodiment of a computer suitable for use in performing various functions presented herein.

The computer 2000 includes a processor 2002 (e.g., a central processing unit (CPU), a processor, a processor having a set of processor cores, a processor core of a processor, or the like) and a memory 2004 (e.g., a random access memory, a read only memory, or the like). The processor 2002 and the memory 2004 may be communicatively connected. In at least some example embodiments, the computer 2000 may include at least one processor and at least one memory including computer program code, wherein the at least one memory and the computer program code are configured to, with the at least one processor, cause the computer to perform various functions presented herein.

The computer 2000 also may include a cooperating element 2005. The cooperating element 2005 may be a hardware device. The cooperating element 2005 may be a process that can be loaded into the memory 2004 and executed by the processor 2002 to implement various functions presented herein (in which case, for example, the cooperating element 2005 (including associated data structures) can be stored on a non-transitory computer-readable storage medium, such as a storage device or other suitable type of storage element (e.g., a magnetic drive, an optical drive, or the like)).

The computer 2000 also may include one or more input/output devices 2006. The input/output devices 2006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2000 may represent a general architecture and functionality suitable for implementing functional elements described herein, portions of functional elements described herein, or the like, as well as various combinations thereof. For example, computer 2000 may provide a general architecture and functionality that is suitable for implementing one or more elements presented herein.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   a decode unit configured to decode a set of instructions of an execution sequence, wherein a first instruction of the set of instructions is decoded into a first set of micro-operations and a second instruction of the set of instructions is decoded into a second set of micro-operations; and
   a micro-operations cache configured to:
      store the first set of micro-operations in a first cache line of the micro-operations cache and the second set of micro-operations in a second cache line of the micro-operations cache; and
      assign, at the micro-operations cache based on the first set of micro operations and the second set of micro-operations being associated with the execution sequence, the first cache line and the second cache line to an affinity group for the execution sequence.

2. The apparatus of claim 1, wherein, to assign the first cache line to the affinity group for the execution sequence, the micro-operations cache is configured to:
   store, by the micro-operations cache for the first cache line, an affinity group record indicative of assignment of the first cache line to the affinity group for the execution sequence.

3. The apparatus of claim 2, wherein the affinity group record is stored as a part of metadata of the first cache line.

4. The apparatus of claim 2, wherein the affinity group record includes an affinity group identifier of the affinity group for the execution sequence and a position value indicative of a position of the first cache line in the affinity group for the execution sequence.

5. The apparatus of claim 1, wherein, to assign the second cache line to the affinity group for the execution sequence, the micro-operations cache is configured to:
   store, by the micro-operations cache for the second cache line, an affinity group record indicative of assignment of the second cache line to the affinity group for the execution sequence.

6. The apparatus of claim 5, wherein the affinity group record is stored as a part of metadata of the second cache line.

7. The apparatus of claim 5, wherein the affinity group record includes an affinity group identifier of the affinity group for the execution sequence and a position value indicative of a position of the second cache line in the affinity group for the execution sequence.

8. The apparatus of claim 1, wherein the first cache line is assigned to a first position of the affinity group for the execution sequence, wherein the second cache line is assigned to a second position of the affinity group for the execution sequence.

9. The apparatus of claim 1, wherein, to assign the first cache line and the second cache line to the affinity group for the execution sequence, the micro-operations cache is configured to:
   store, by the micro-operations cache for the first cache line, a first affinity group record indicative of assignment of the first cache line to the affinity group for the execution sequence; and
   store, by the micro-operations cache for the second cache line, a second affinity group record indicative of assignment of the second cache line to the affinity group for the execution sequence.

10. The apparatus of claim 9, wherein:
    the first affinity group record includes an affinity group identifier of the affinity group for the execution sequence and a first position value indicative of a position of the first cache line in the affinity group for the execution sequence; and
    the second affinity group record includes the affinity group identifier of the affinity group for the execution sequence and a second position value indicative of a position of the second cache line in the affinity group for the execution sequence.

11. The apparatus of claim 1, wherein the micro-operations cache is configured to:
    identify, based on a request to lookup the first instruction of the execution sequence, the first cache line storing the first set of micro-operations;
    determine, based on the first cache line, the affinity group for the execution sequence;
    determine, based on the affinity group for the execution sequence, that the second cache line is assigned to the affinity group for the execution sequence; and
    supply, to an execution unit based on the first cache line and the second cache line being assigned to the affinity group for the execution sequence, a group of micro-operations including each micro-operation in the first cache line and each micro-operation in the second cache line.

12. The apparatus of claim 11, wherein the micro-operations in the group of micro-operations are supplied to the execution unit in an order that is based on respective positions of the first cache line and the second cache line in the affinity group for the execution sequence.

13. A method, comprising:
decoding, by a decode unit, a set of instructions of an execution sequence, wherein a first instruction of the set of instructions is decoded into a first set of micro-operations and a second instruction of the set of instructions is decoded into a second set of micro-operations;
storing, by a micro-operations cache, the first set of micro-operations in a first cache line of the micro-operations cache and the second set of micro-operations in a second cache line of the micro-operations cache; and
assigning, at the micro-operations cache based on the first set of micro-operations and the second set of micro-operations being associated with the execution sequence, the first cache line and the second cache line to an affinity group for the execution sequence.

14. The method of claim 13, wherein assigning the first cache line to the affinity group for the execution sequence includes:
storing, by the micro-operations cache for the first cache line, an affinity group record indicative of assignment of the first cache line to the affinity group for the execution sequence.

15. The method of claim 14, wherein the affinity group record is stored as a part of metadata of the first cache line.

16. The method of claim 14, wherein the affinity group record includes an affinity group identifier of the affinity group for the execution sequence and a position value indicative of a position of the first cache line in the affinity group for the execution sequence.

17. The method of claim 13, further comprising:
storing, by the micro-operations cache for the second cache line, an affinity group record indicative of assignment of the second cache line to the affinity group for the execution sequence.

18. The method of claim 17, wherein the affinity group record is stored as a part of metadata of the second cache line.

19. The method of claim 17, wherein the affinity group record includes an affinity group identifier of the affinity group for the execution sequence and a position value indicative of a position of the second cache line in the affinity group for the execution sequence.

20. The method of claim 13, wherein the first cache line is assigned to a first position of the affinity group for the execution sequence, wherein the second cache line is assigned to a second position of the affinity group for the execution sequence.

21. The method of claim 13, wherein assigning the first cache line and the second cache line to the affinity group for the execution sequence comprises:

storing, by the micro-operations cache for the first cache line, a first affinity group record indicative of assignment of the first cache line to the affinity group for the execution sequence; and
storing, by the micro-operations cache for the second cache line, a second affinity group record indicative of assignment of the second cache line to the affinity group for the execution sequence.

22. The method of claim 21, wherein:
the first affinity group record includes an affinity group identifier of the affinity group for the execution sequence and a first position value indicative of a position of the first cache line in the affinity group for the execution sequence; and
the second affinity group record includes the affinity group identifier of the affinity group for the execution sequence and a second position value indicative of a position of the second cache line in the affinity group for the execution sequence.

23. The method of claim 13, further comprising:
identifying, based on a request to lookup the first instruction of the execution sequence, the first cache line storing the first set of micro-operations;
determining, based on the first cache line, the affinity group for the execution sequence;
determining, based on the affinity group for the execution sequence, that the second cache line is assigned to the affinity group for the execution sequence; and
supplying, to an execution unit based on the first cache line and the second cache line being assigned to the affinity group for the execution sequence, a group of micro-operations including each micro-operation in the first cache line and each micro-operation in the second cache line.

24. The method of claim 23, wherein the micro-operations in the group of micro-operations are supplied to the execution unit in an order that is based on respective positions of the first cache line and the second cache line in the affinity group for the execution sequence.

25. A non-transitory computer-readable storage medium storing computer program code which, when executed by an apparatus, causes the apparatus at least to perform:
decoding, by a decode unit, a set of instructions of an execution sequence, wherein a first instruction of the set of instructions is decoded into a first set of micro-operations and a second instruction of the set of instructions is decoded into a second set of micro-operations;
storing, by a micro-operations cache, the first set of micro-operations in a first cache line of the micro-operations cache and the second set of micro-operations in a second cache line of the micro-operations cache; and
assigning, at the micro-operations cache based on the first set of micro-operations and the second set of micro-operations being associated with the execution sequence, the first cache line and the second cache line to an affinity group for the execution sequence.

\* \* \* \* \*